(12) United States Patent
Walker et al.

(10) Patent No.: US 11,900,144 B2
(45) Date of Patent: Feb. 13, 2024

(54) QUANTUM COMPUTER PHASE TRACKING AND CORRECTION

(71) Applicant: Quantinuum LLC, Broomfield, CO (US)

(72) Inventors: James A. Walker, Boulder, CO (US); Dominic Lucchetti, Morris Plains, NJ (US); Bryce J. Bjork, Boulder, CO (US); Caroline Figgatt, Morris Plains, NJ (US); Patricia Lee, Morris Plains, NJ (US); Gerald Chambers, Morris Plains, NJ (US); Benjamin Arkin, Morris Plains, NJ (US)

(73) Assignee: Quantinuum LLC, Broomfield, CO (US)

( * ) Notice: Subject to any disclaimer, the term of this patent is extended or adjusted under 35 U.S.C. 154(b) by 707 days.

(21) Appl. No.: 16/716,973

(22) Filed: Dec. 17, 2019

(65) Prior Publication Data
US 2021/0182096 A1    Jun. 17, 2021

(51) Int. Cl.
*G06N 10/40* (2022.01)
*G06F 9/46* (2006.01)
*G06N 10/00* (2022.01)

(52) U.S. Cl.
CPC ............. *G06F 9/466* (2013.01); *G06N 10/00* (2019.01); *G06N 10/40* (2022.01)

(58) Field of Classification Search
None
See application file for complete search history.

(56) References Cited

U.S. PATENT DOCUMENTS

| | | |
|---|---|---|
| 2018/0260732 A1 | 9/2018 | Bloom et al. |
| 2019/0156235 A1 | 5/2019 | Zhang et al. |
| 2019/0205784 A1 | 7/2019 | Monroe et al. |

FOREIGN PATENT DOCUMENTS

| | | |
|---|---|---|
| JP | 2019-513249 A | 5/2019 |
| WO | 2019/136213 A1 | 7/2019 |

OTHER PUBLICATIONS

"Quantum Technology Monitor" by Mckinsey & Company Mohr et al. pp. 1-52 (Year: 2022).*

(Continued)

*Primary Examiner* — Bradley Smith
(74) *Attorney, Agent, or Firm* — Alston & Bird LLP

(57) ABSTRACT

A controller of a quantum system identifies a phase update trigger for a quantum object of the quantum system and an interaction time. Responsive to identifying the phase update trigger, the controller determines, for between a first time and the interaction time, (a) a location/transport effect on a phase of the quantum object based on locations thereof and transport operations performed thereon, and (b) a quantum operation effect on the phase of the quantum object based on any quantum operations applied thereto. The immediately previous phase update for the quantum object occurred at the first time. Based on the location/transport effect, the quantum operation effect, and the interaction time, the controller determines an interaction time phase of the quantum object. The controller adjusts operation of a manipulation source such that a phase of a signal generated by the manipulation source corresponds to the interaction time phase at the interaction time.

21 Claims, 9 Drawing Sheets

(56) References Cited

OTHER PUBLICATIONS

"Quantum Computing in the NISQ era and beyond" John Preskill Quantum pp. 1-20 (Year: 2018).*
Examination report issued in Australian Application No. 2020277198 dated Oct. 15, 2021, 5 pages.
Kielpinski, et al., "Architecture for a large-scale ion-trap quantum computer," Nature, 2002, 417, 709-711. https://doi.org/10.1038/nature00784.
Office Action issued in Japanese Application No. 2020-205690 dated Oct. 22, 2021, 4 pages.
Extended European Search Report issued in European Application No. 20211374.2 dated May 31, 2021, 8 pages.
Figgatt, Caroline M. "Building and Programming a Universal Ion Trap Quantum Computer". 2018. University of Maryland, PhD Dissertation (211 pages). DOI: https://doi.org/10.13016/M2K35MH5F Retrieved from the Internet: URL:https://drum.lib.umd.edu/handle/1903/2 1008?show=full.
Häffner, H., Quantum computing with trapped ions, Physics Reports, vol. 469, Issue 4, 2008, pp. 1-99. https://doi.org/10.1016/j.physrep.2008.09.003.
Lee, PJ, "Phase Control of Trapped Ion Quantum Gates", FOCUS Center and Department of Physics, University of Michigan, 2005, pp. 1-29.
CA Office Action dated Mar. 23, 2022 for CA Application No. 3101918, 4 pages.
English translation of JP Decision to Grant dated Mar. 29, 2022 for JP Application No. 2020205690, 2 pages.
JP Decision to Grant dated Mar. 29, 2022 for JP Application No. 2020205690, 3 pages.
English translation of JP Search report dated Oct. 20, 2021 for JP Application No. 2020205690, 9 pages.
JP Search report dated Oct. 20, 2021 for JP Application No. 2020205690, 6 pages.
AU Notice of Allowance dated Oct. 20, 2022 for AU Application No. 2020277198.
AU Office Action dated Apr. 27, 2022 for AU Application No. 2020277198.
AU Office Action dated Sep. 23, 2022 for AU Application No. 2020277198.
Ruster, T., "Entanglement-based magnetometry in a scalable ion-trap quantum processor", Thesis, Dec. 13, 2017, Johannes Gutenberg-University in Mainz, retreived from the Internet at: <URL: https://openscience.ub.uni-mainz.de/bitstream/20.500.12030/3857/1/100002461.pdf >, 122 pages.
English Translation of KR Office Action dated Mar. 20, 2023 for KR Application No. 10-2020-0167452, 5 page(s).
KR Office Action dated Mar. 20, 2023 for KR Application No. 10-2020-0167452, 4 page(s).
Mount, Emily, et al., "Scalable Digital Hardware for a Trapped Ion Quantum Computer", Quantum Information Processing, Sep. 29, 2015, pp. 5281-5298, vol. 15, retrieved from the Internet at https://arxiv.org/pdf/1504.00035.pdf on Apr. 11, 2023.
CA Office Action dated Jan. 26, 2023 for CA Application No. 3101918.
English Translation of IL Office Action dated Apr. 30, 2023 for IL Application No. 279016, 3 page(s).
EP Office Action dated Jun. 28, 2023 for EP Application No. 20211374, 8 page(s).
IL Office Action dated Apr. 30, 2023 for IL Application No. 279016, 3 page(s).
English translation of JP Decision to Grant dated Apr. 14, 2023 for JP Application No. 2022072962, 2 page(s).
JP Decision to Grant dated Apr. 14, 2023 for JP Application No. 2022072962, 3 page(s).
English Translation of KR Office Action dated Sep. 22, 2023 for KR Application No. 10-2020-0167452, 4 page(s).
KR Office Action dated Sep. 22, 2023 for KR Application No. 10-2020-0167452, 4 page(s).
CA Notice of Allowance dated Nov. 10, 2023 for CA Application No. 3101918, 1 page(s).

* cited by examiner

| Time | Qubit Position A B C D E F G | Phase Accumulation $\Delta\varphi_0$ | $\Delta\varphi_1$ | $\Delta\varphi_2$ | $\Delta\varphi_3$ | Quantum Operations |
|---|---|---|---|---|---|---|
| $t_1$ | 0 _ 1 _ _ 2 _ 3 | -1 | -1 | -1 | -1 | Configure ([0, ,1, ,2, ,3], [$f_A$,...,$f_G$]) |
| $t_2$ | _ 0 1 _ _ 2 3 | -1 | -1 | -1 | -1 | Transport( ,0,1, , ,2,3) |
| $t_3$ | _ 0 1 _ _ 2 3 | 0 | -1 | 0 | -1 | StatePrep(B,F) <br> $\Delta\varphi_{0,2} = 0$ |
| $t_4$ | _ 0 1 _ _ 2 3 | $\Delta\varphi_0(t_4)$ | -1 | $\Delta\varphi_2(t_4)$ | -1 | phase$_0$ = $\Delta\varphi_0 + \Phi_m$; phase$_2$ = $\Delta\varphi_2 + \Phi_n$ <br> SQGate((B, $\Theta_m, \Phi_m$), (F, $\Theta_n, \Phi_n$)) <br> $\Delta\varphi_0$ += $\varphi_{stark}$(gate$_B$) <br> $\Delta\varphi_2$ += $\varphi_{stark}$(gate$_F$) |
| $t_5$ | 0 1 _ _ 2 3 _ | $\Delta\varphi_0(t_5)$ | -1 | $\Delta\varphi_2(t_5)$ | -1 | $\Delta\varphi_{0,2}$ += $f_{B,F}$ * $(t_4-t_3)$ <br> Transport(0,1, , ,2,3, ) <br> $\Delta\varphi_{0,2}$ += $2\pi f_T$ * $(t_5-t_4)$ |
| $t_6$ | 0 1 _ _ 2 3 _ | $\Delta\varphi_0(t_6)$ | 0 | $\Delta\varphi_2(t_6)$ | 0 | StatePrep(B,F) <br> $\Delta\varphi_{0,2}$ += $f_{A,E}$ * $(t_6-t_5)$ <br> $\Delta\varphi_{1,3} = 0$ |
| $t_7$ | 0 1 _ _ 2 3 _ | $\Delta\varphi_0(t_7)$ | $\Delta\varphi_1(t_7)$ | $\Delta\varphi_2(t_7)$ | $\Delta\varphi_3(t_7)$ | phase$_1$ = $\Delta\varphi_1 + \Phi_m$; phase$_3$ = $\Delta\varphi_3 + \Phi_n$ <br> SQGate((B, $\Theta_m, \Phi_m$), (F, $\Theta_n, \Phi_n$)) <br> $\Delta\varphi_1$ += $\varphi_{stark}$(gate$_B$) <br> $\Delta\varphi_3$ += $\varphi_{stark}$(gate$_F$) |
| $t_8$ | _ 01 _ _ _ 23 _ | $\Delta\varphi_0(t_8)$ | $\Delta\varphi_1(t_8)$ | $\Delta\varphi_2(t_8)$ | $\Delta\varphi_3(t_8)$ | $\Delta\varphi_{0,1,2,3}$ += $f_{A,B,E,F}$ * $(t_7-t_6)$ <br> Transport( ,01, , ,23, ) <br> $\Delta\varphi_{0,1,2,3}$ += $2\pi f_T$ * $(t_8-t_7)$ |
| $t_9$ | _ 01 _ _ _ 23 _ | $\Delta\varphi_0(t_9)$ | $\Delta\varphi_1(t_9)$ | $\Delta\varphi_2(t_9)$ | $\Delta\varphi_3(t_9)$ | TQGate(B,F) <br> $\Delta\varphi_{0,1}$ += $\varphi_{stark}$(gate$_B$) <br> $\Delta\varphi_{2,3}$ += $\varphi_{stark}$(gate$_F$) <br> $\Delta\varphi_{0,1,2,3}$ += $f_{B,B,F,F}$ * $(t_9-t_8)$ |

FIG. 5

QUANTUM COMPUTER PHASE TRACKING AND CORRECTION

TECHNICAL FIELD

Various embodiments relate to tracking the phase of a quantum object (e.g., qubit) within a quantum system and performing phase corrections for quantum system manipulation sources. For example, various embodiments relate to qubit phase tracking in a quantum computer.

BACKGROUND

Quantum systems require the use of quantum mechanics for an accurate description of the time evolution of quantum objects and may use a phase to describe, at least in part, the quantum state of a quantum object. In various quantum systems, a quantum object of the quantum system may experience various environmental effects which may cause the phase of the quantum object to be different from that of passive phase evolution over time (e.g., in the absence of electro-magnetic fields and/or other environmental effects). For example, if an ion of a quantum system is a qubit of a trapped ion quantum computer, the qubit may experience various environmental effects related to electric and/or magnetic fields and temperature depending on the location or region/section of the ion trap in which the qubit is located. These environmental effects may impact the phase of the qubit. In addition, as quantum operations (e.g., gates) are performed on the qubit, energy may be added to the qubit which also impacts the phase of that qubit.

BRIEF SUMMARY OF EXAMPLE EMBODIMENTS

According to a first aspect, a method is provided. In an example embodiment, the method comprises identifying, by a controller corresponding to a quantum system, a phase update trigger for a particular quantum object of the quantum system. The quantum object is an atom or an ion. The phase update trigger corresponds to an interaction time. The method further comprises, responsive to identifying the phase update trigger, determining, by the controller, a location and transport effect on a phase of the particular quantum object based on one or more locations of the particular quantum object and one or more transport operations performed on the particular quantum object between a first time and the interaction time; and determining, by the controller, a quantum operation effect on the phase of the particular quantum object based on any quantum operations applied to the particular quantum object between the first time and the interaction time. An immediately previous phase update for the particular quantum object occurred at the first time. The method further comprises determining, by the controller and based on the location and transport effect, the quantum operation effect, and the interaction time, an interaction time phase of the particular quantum object. The method further comprises causing, by the controller, phases of one or more signals (a) generated by one or more manipulations sources and (b) corresponding to the phase update trigger to be adjusted such that the phases of the one or more signals correspond to the interaction time phase of the particular quantum object at the interaction time.

In an example embodiment, the one or more signals are incident on the particular quantum object at the interaction time. In an example embodiment, the one or more manipulation sources comprise at least one of (a) one or more lasers or (b) one or more voltage sources. In an example embodiment, the quantum operation effect corresponds to a Stark shift. In an example embodiment, the quantum system is part of a trapped ion quantum computer and the particular quantum object is a qubit of the trapped ion quantum computer. In an example embodiment, a phase of a signal of the one or more signals corresponds to the interaction time phase of the particular quantum object when an absolute value of a difference between the phase of the signal and the interaction time phase of the particular quantum object satisfies a phase difference threshold requirement. In an example embodiment, the absolute value of the difference between the phase of the signal and the interaction time phase satisfies the phase difference threshold requirement when the absolute value of the difference between the phase of the signal and the interaction time phase is less than a set phase difference threshold. In an example embodiment, the phase update trigger is identified by determining that an application of the one or more signals to the particular quantum object or qubit is scheduled to occur at the interaction time. In an example embodiment, the identifying of the phase update trigger corresponding to the particular quantum object, the determining of the location and transport effect of the phase of the particular quantum object, the determining of the quantum operation effect on the phase of the particular quantum object, and the causing of the adjusting of the phases of the one or more signals are performed in real-time or near real-time with respect to one another. In an example embodiment, the location and transport effect corresponds to a phase change due to changes to an effective frequency of the particular quantum object based on one or more locations of the particular quantum object and transport of the particular quantum object through the one or more locations between the first time and the interaction time.

According to another aspect, a controller associated with a quantum system is provided. In an example embodiment, the controller comprises at least one processing element and at least one memory including/storing computer program code. The at least one memory and the computer program code are configured to, with the processing element, cause the controller to at least identify a phase update trigger for a particular quantum object of the quantum system and corresponding to an interaction time. The at least one memory and the computer program code are further configured to, with the processing element, cause the controller to at least, responsive to identifying the phase update trigger, determine a location and transport effect on a phase of the particular quantum object based on one or more locations of the particular quantum object and one or more transport operations performed on the particular quantum object between a first time and the interaction time; determine a quantum operation effect on the phase of the particular quantum object based on any quantum operations applied to the particular quantum object between the first time and the interaction time; based on the location and transport effect, the quantum operation effect, and the interaction time, determine an interaction time phase of the particular quantum object; and cause phases of one or more signals (a) generated by one or more manipulation sources and (b) corresponding to the phase update trigger to be adjusted such that the phases of the one or more signals correspond to the interaction time phase of the particular quantum object at the interaction time. An immediately previous phase update for the particular quantum object occurred at the first time.

In an example embodiment, the one or more signals are incident on the particular quantum object at the interaction time. In an example embodiment, the one or more manipulation sources comprise at least one of (a) one or more lasers or (b) one or more voltage sources. In an example embodiment, the quantum operation effect corresponds to a Stark shift. In an example embodiment, the quantum system is part of a trapped ion quantum computer and the particular quantum object is a qubit of the trapped ion quantum computer. In an example embodiment, a phase of a signal of the one or more signals corresponds to the interaction time phase of the particular quantum object when an absolute value of a difference between the phase of the signal and the interaction time phase of the particular quantum object satisfies a phase difference threshold requirement. In an example embodiment, the absolute value of the difference between the phase of the signal and the interaction time phase satisfies the phase difference threshold requirement when the absolute value of the difference between the phase of the signal and the interaction time phase is less than a set phase difference threshold. In an example embodiment, the phase update trigger is identified by determining that an application of the one or more signals to the particular quantum object or qubit is scheduled to occur at the interaction time. In an example embodiment, the identifying of the phase update trigger corresponding to the particular quantum object, the determining of the location and transport effect of the phase of the particular quantum object, the determining of the quantum operation effect on the phase of the particular quantum object, and the causing of the adjusting of the phases of the one or more signals are performed in real-time or near real-time with respect to one another. In an example embodiment, the location and transport effect corresponds to a phase change due to changes to an effective frequency of the particular quantum object based on one or more locations of the particular quantum object and transport of the particular quantum object through the one or more locations between the first time the interaction time.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a schematic diagram of an example quantum computer system, in accordance with an example embodiment.

FIG. 2A provides a schematic diagram of an example of tracking the change in phase of the qubit based on location and/or transport of the qubit, in accordance with an example embodiment; and FIG. 2B provides a flowchart illustrating example processes, procedures, and/or operations of tracking the change in phase of the qubit due to location and/or transport of the qubit for the example provided in FIG. 2A, in accordance with an example embodiment.

FIG. 3 provides a schematic diagram illustrating an example of tracking the change in phase of the qubit due to the application of signals generated by manipulation sources to the qubit, in accordance with an example embodiment.

FIG. 5 illustrates an example scenario of performing single and two qubit gates on four qubits, according to an example embodiment.

Figure 6:
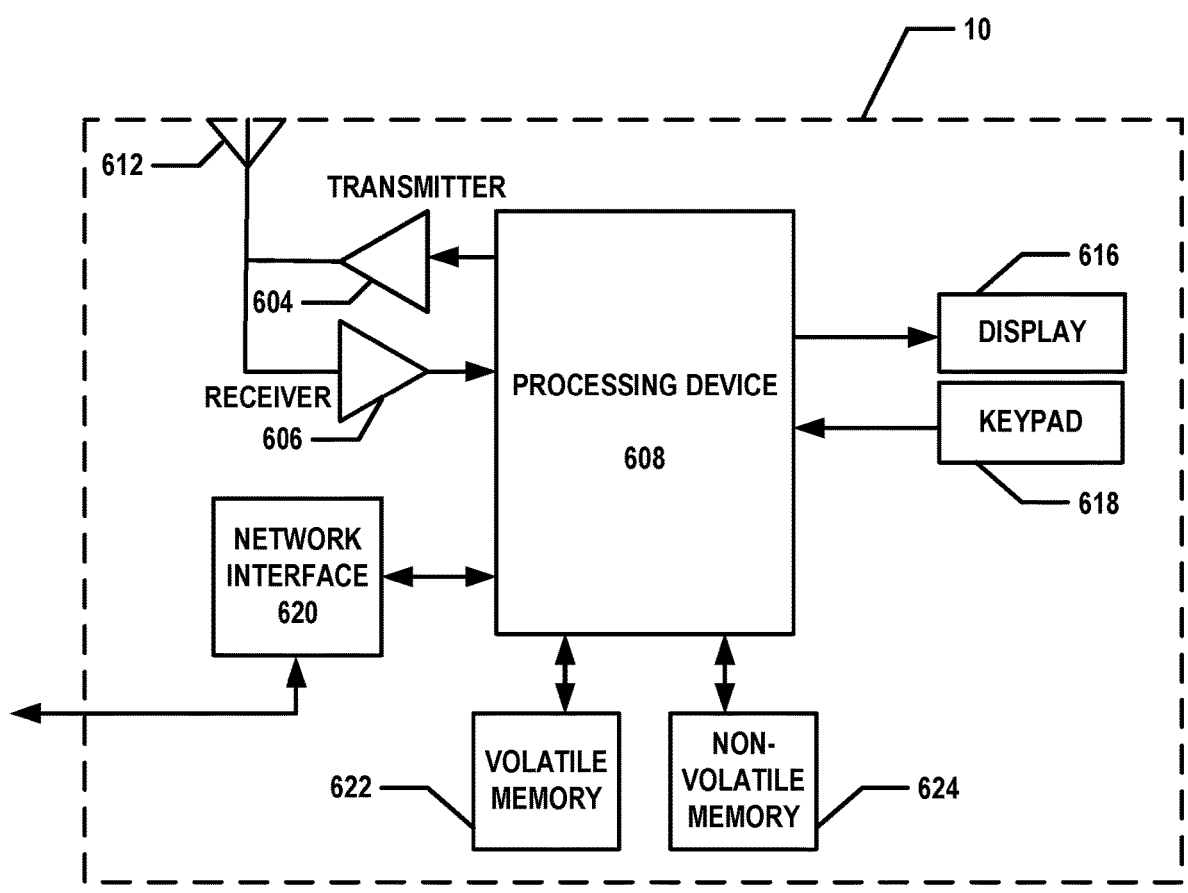

FIG. 6 provides a schematic diagram of an example user computing entity that may be used in accordance with an example embodiment.

Figure 7:
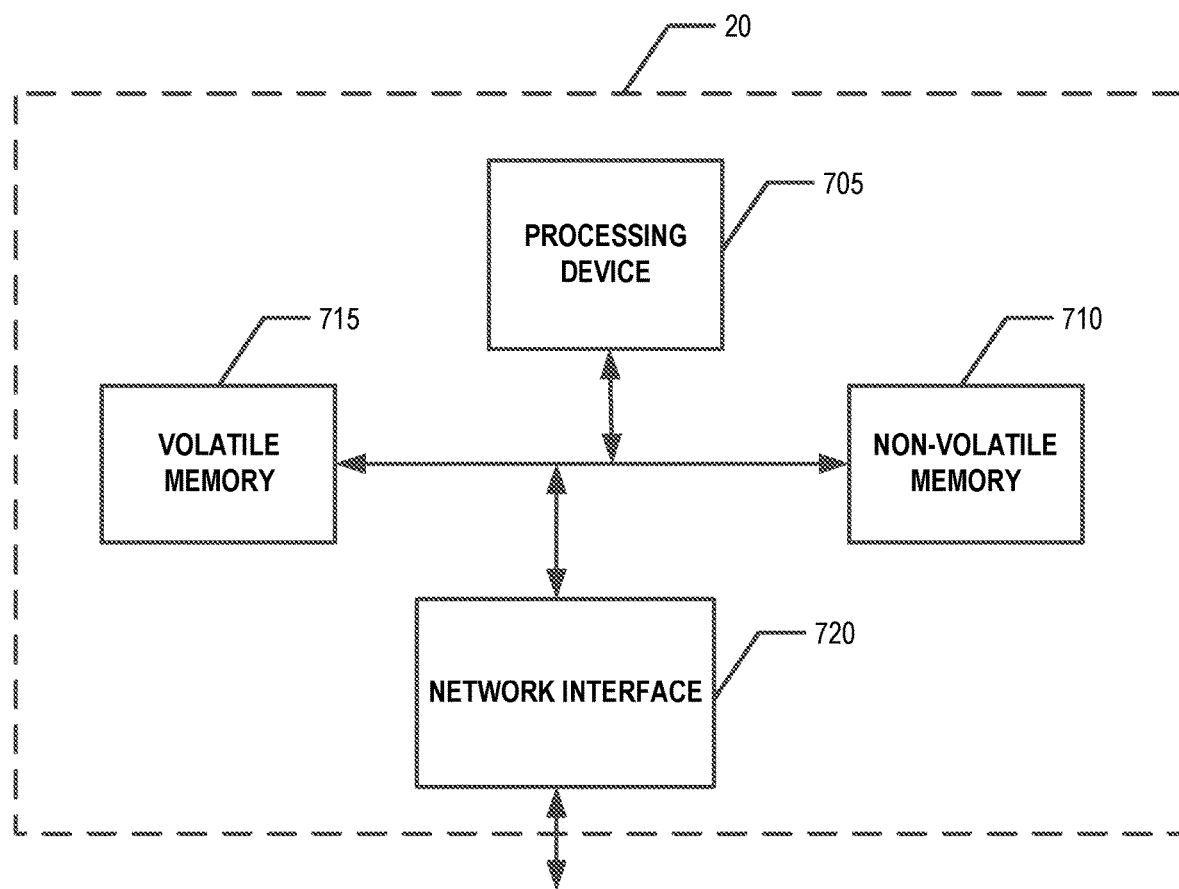

FIG. 7 provides a schematic diagram of an example system computing entity that may be used in accordance with an example embodiment.

Figure 8:
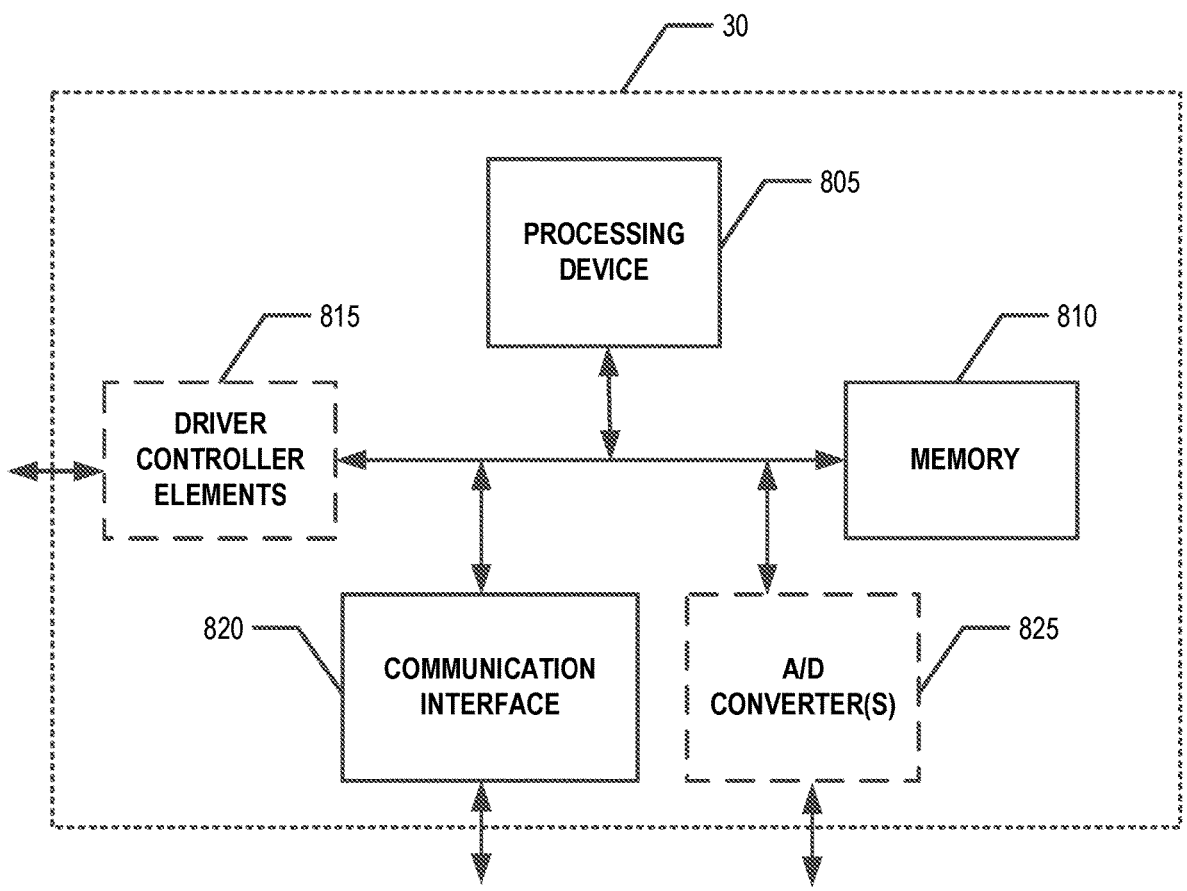

FIG. 8 provides a schematic diagram of an example controller that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within appropriate engineering and/or manufacturing tolerances and/or within user measurement capabilities, unless otherwise indicated. Like numbers refer to like elements throughout.

As noted above, quantum objects of a quantum system may experience various environmental effects that may impact the phase of the quantum objects. In various embodiments, the quantum system is part of a quantum computer and the quantum objects are qubits of the quantum computer. For example, a quantum system may be used for performing quantum computations and/or quantum calculations. For example, the quantum system may be part of a superconducting quantum computer and the quantum objects are the state of small superconducting circuits. In another example, the quantum system may be part of a trapped ion quantum computer and/or an optical lattice quantum computer and the quantum objects are atomic objects (e.g., atoms or ions). In another example, the quantum system is part of a photonic-based quantum computer and the quantum objects are photons. In the example of qubits of a trapped ion quantum computer, qubits may experience various environmental effects related to electric and/or magnetic fields and temperature, depending on the location or region of the ion trap in which that the qubit is located, that impact the phases of the qubits. Moreover, as quantum operations (e.g., gates) are performed on qubits within the quantum computer, energy may be added to the qubits which may also impact the phases of the qubits. However, if a manipulation source (e.g., voltage source, laser, direct digital synthesis (DDS), and/or the like) applies a signal (e.g., voltage, laser beam, and/or the like) to a qubit where the phase of the signal does not correspond to the phase of the qubit, the qubit may be jolted. Such jolting of qubits may directly impact qubit coherence, qubit gate fidelity, and the overall quantum computer error rate.

Example embodiments provide methods, apparatus, and systems for tracking the phase of quantum objects of a quantum system and correcting the phase of signals of manipulation sources that are to be applied to the quantum objects. As used herein, quantum objects may be atoms, ions, or other objects or particles that are trapped within and/or manipulated within the quantum system. For example, various embodiments provide methods, apparatus, and systems for tracking the phase of qubits of a trapped ion quantum computer and correcting the phase of signals of manipulation sources (e.g., voltage sources, laser beams, DDS, and/or the like) applied to the qubits. In various embodiments, the phase tracking is performed in real-time or near real-time. For example, responsive to identifying a phase update trigger during the operation of the quantum computer, the phase of a particular qubit may be determined. In various embodiments, since the phase tracking is performed in real-time or near real-time (e.g., during the operation of the quantum computer), branching of the quantum algorithm/program being executed is enabled. For example, the real-time or near real-time phase tracking of various embodiments enables the quantum algorithm/program to be changed, branched, and/or the like during the execution of the quantum algorithm/program.

In various embodiments, the quantum computer (or other quantum system) includes a transport-enabled ion trap. For example, the quantum system may be within the transport-enabled ion trap. For example, the quantum computer (or other quantum system) includes an ion trap comprising a plurality of regions and the qubit (or other quantum object) may be transported between one or more of the plurality of regions defined within the ion trap. In various embodiments, the impact to the phase of the qubit due to the location and/or transport of the qubit within the ion trap may be tracked. In various embodiments, the application of a quantum operation (e.g., a quantum gate applied via one or more laser beams incident on and/or interacting with the qubit) may cause the qubit to experience a phase shift (e.g., corresponding to a Stark shift). Various embodiments determine the phase of the qubit and/or the change in phase of the qubit based on location and/or transport of the qubit and application of quantum operations (and/or other signals generated by manipulation sources) to the qubit.

In various embodiments, the phase of a qubit is determined responsive to a phase update trigger being identified. For example, responsive to identifying a phase update trigger, the change in phase of a particular qubit since the last phase determination and/or phase update for the particular qubit may be determined. In an example embodiment, the phase update trigger may be identified by determining that a command corresponding to applying a signal generated by a manipulation source to the particular qubit has been scheduled, is scheduled to be performed within a particular time window, is scheduled to be the next event to occur for the particular qubit, the next event to be executed by the controller, and/or the like. In various embodiments, the phase update trigger is identified in response to determining that a signal is scheduled to be provided to the particular qubit by a manipulation source. The phase of the qubit at the time of the interaction (e.g., at the interaction time) may be determined, and the phase of the signal provided by the manipulation source may be modified and/or adjusted such that the phase of the signal will correspond to the phase of the qubit when the signal is incident on and/or interacts with the qubit (e.g., at the interaction time). In an example embodiment, the phase of the signal corresponds to the phase of the qubit when the phase of the signal and the phase of the qubit match and/or are approximately equal to one another. For example, the phase of the signal $\phi_s$ corresponds to the phase of the qubit $\phi_q$ when the absolute value of the difference between the phase of the signal $\phi_s$ corresponds to the phase of the qubit $\phi_q$ is less than or equal to a threshold phase difference $\Delta\phi_T$ (e.g., $|\phi_s-\phi_q|\leq\Delta\phi_T$). In various embodiments, the performance of the quantum system (e.g., the robustness and/or repeatability of results) is improved when the threshold phase difference $\Delta\phi_T$ is made smaller (e.g., set closer to zero).

As described above, in various quantum systems, it is important to apply a signal generated by a manipulation source to a quantum object of a quantum system such that the phase of the signal corresponds to, matches, and/or is approximately equal to the phase of the quantum object at the time when the signal interacts with the quantum object. Various embodiments provide for the tracking of the phase of quantum objects of quantum systems and the phase correction of signals generated by manipulation sources to be applied to the quantum objects. In various embodiments, the tracking of the phase of the quantum objects and phase correction of the signals are performed in real-time and/or near real-time with respect to the manipulation of the quantum objects (e.g., via application of the signals to the quantum objects) of the quantum system. Various example embodiments correspond to trapped ion quantum computer systems, the tracking of phases of qubits of the trapped ion quantum computer, and the phase correction of signals applied to the qubits. In various embodiments, the tracking of the phase of the qubits and phase correction of the signals are performed in real-time and/or near real-time with respect to interaction of the signals with the qubits of the trapped ion quantum computer.

Exemplary Quantum Computer System

Figure 1:
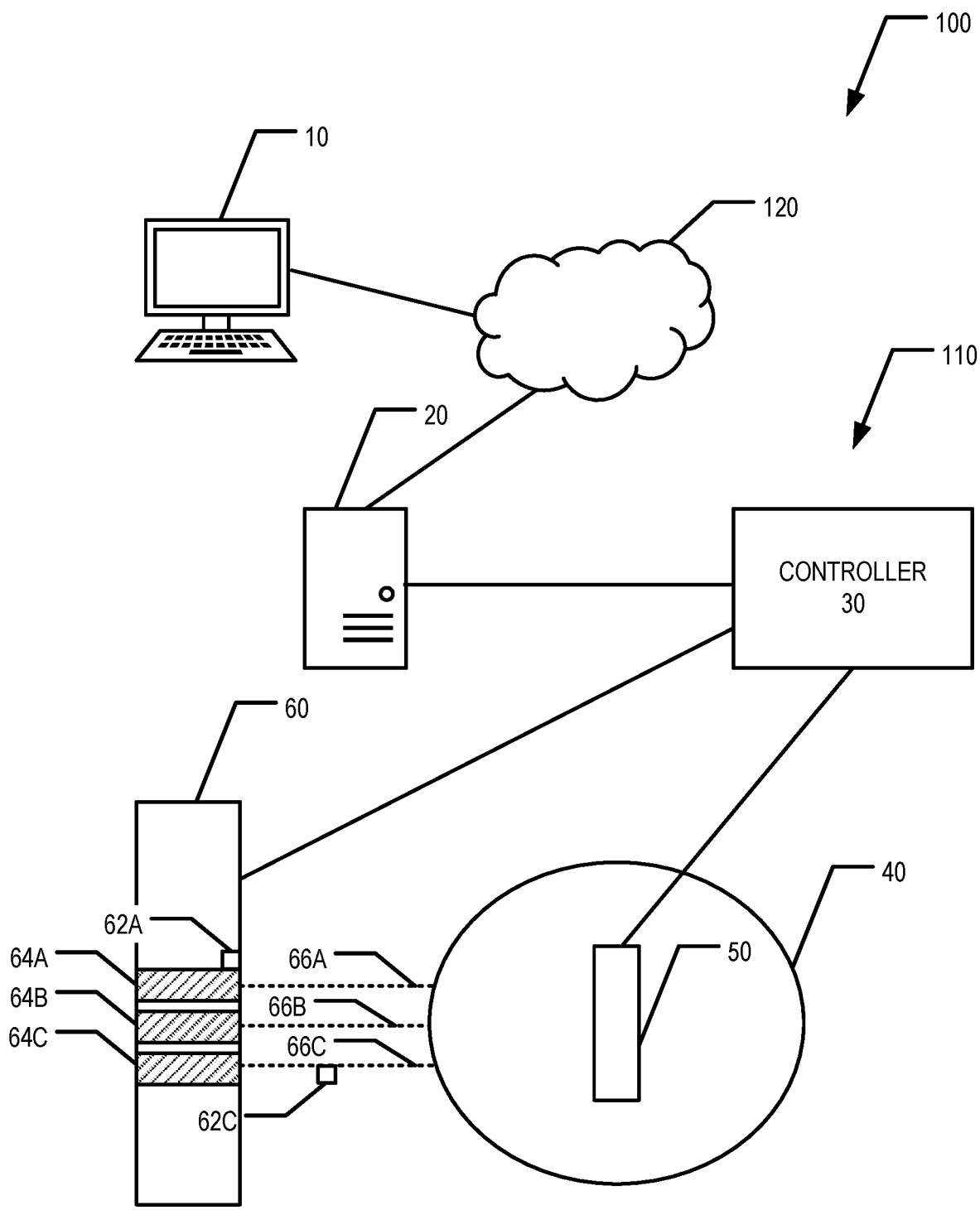

FIG. 1 provides a schematic diagram of an example quantum system, in accordance with an example embodiment, in which the quantum system is part of a trapped ion quantum computer system 100. In various embodiments, the trapped ion quantum computer system 100 comprises a user computing entity 10, a system computing entity 20, and a quantum computer 110. In various embodiments, the quantum computer 110 comprises a controller 30, a cryogenic and/or vacuum chamber 40 enclosing an ion trap 50, and a manipulation system 60 comprising one or more manipulation sources (e.g., lasers, voltage sources, DDS, and/or the like). In various embodiments, the manipulation system 60 is configured to provide one or more signals (e.g., generated by the manipulation sources 64 (e.g., 64A, 64B, 64C)) to one or more qubits within the ion trap 50 via signal paths 66 (e.g., 66A, 66B, 66C). In various embodiments, the signals 66 comprise one or more of optical paths, optical fibers, electrical cables, and/or the like. In various embodiments, one or more calibration sensors 62 may be coupled to one or more manipulation sources 64 and/or signal paths 66, configured to monitor one or more operation characteristics of the corresponding manipulation source 64 and/or signal, and provide indications of the results of monitoring the one or more operation characteristics to the controller 30.

In various embodiments, a user computing entity 10 is configured to allow a user to provide input to the quantum computer system 100 (e.g., via a user interface of the user computing entity 10) and receive, view, and/or the like output from the quantum computer system 100. The user computing entity 10 may be in communication with the system computing entity 20 via one or more wired or wireless networks 120. The system computing entity 20 is configured to act as an intermediary between one or more user computing entities 10 and the controller 30. For example, the system computing entity 20 may translate, configure, format, and/or the like information/data, quantum computing algorithms, and/or the like provided by the user computing entity 10 into a computing language, executable instructions, command sets, and/or the like that the controller 30 can understand and/or implement.

In various embodiments, the controller 30 is configured to control the ion trap 50, cooling and/or vacuum systems (not shown) controlling the temperature and pressure within the cryogenic and/or vacuum chamber 40, manipulation sources 64, and/or other components of the quantum computer 110 (e.g., an optical collection system configured for "reading" the output of the quantum computer). In various embodiments, the controller 30 is configured to control various components of the quantum computer 110 in accordance with executable instructions, command sets, and/or the like provided by the system computing entity 20. In various embodiments, the controller 30 is configured to receive output from the quantum computer 110 (e.g., from an optical collection system) and provide the output and/or the result of a processing the output to the system computing entity 20.

In various embodiments, the controller 30 comprises a clock. One or more executable instructions, commands, and/or the like may be received by the controller 30 and each scheduled to be performed at a particular time, as determined by the clock. One or more of the executable instructions, commands, and/or the like may correspond to manipulation events. A manipulation event comprises causing a signal (e.g., generated by a manipulation source 64) to interact with one or more qubits. The interaction may be scheduled, by the controller, to occur at an interaction time. In various embodiments, the scheduling of computer-executable instructions, commands, and/or the like corresponding to and/or causing the occurrence of a manipulation event (e.g., the application of one or more signals (e.g., generated by one or more manipulation sources 64) to a particular qubit and/or pair/group of qubits) at an interaction time may be identified as a phase update trigger corresponding to the particular qubit and/or pair/group of qubits. In an example embodiment, determining that computer-executable instructions, commands, and/or the like corresponding to and/or causing the occurrence of a manipulation event (e.g., the application of one or more signals (e.g., generated by one or more manipulation sources 64) to a particular qubit and/or pair/group of qubits) are scheduled to be executed at an interaction time that is within a time threshold of the current time (e.g., as determined by the clock) may cause a phase update trigger to be identified. In an example embodiment, determining that the next set/group of computer-executable instructions, commands, and/or the like corresponding to and/or causing the occurrence of a manipulation event (e.g., the application of one or more signals (e.g., generated by one or more manipulation sources 64) to a particular qubit and/or pair/group of qubits) is scheduled to be the next set/group of computer-executable instructions, commands, and/or the like executed by the controller may cause a phase update trigger corresponding to the particular qubit and/or pair/group of qubits to be identified.

Responsive to the identification of the phase update trigger corresponding to an interaction time and a particular qubit and/or pair/group of qubits, the controller 30 may determine a location and/or transport effect and/or phase change for the particular qubit and/or for each qubit of the pair/group of qubits. In various embodiments, the phase of a particular qubit and/or pair/group of qubits may be tracked as an accumulation of phase for each qubit. The location and/or transport effect and/or phase change corresponds to the location(s) of a qubit and/or transport of the qubit between the locations that occurred between a first time and the interaction time. The first time is the time at which an immediately previous interaction time for the qubit occurred. Additionally, the controller 30 may determine a quantum operation effect and/or phase change for the particular qubit and/or for each qubit of the pair/group of qubits. The quantum operation effect and/or phase change of a qubit is due to any quantum operations (e.g., quantum gates, laser beams, and/or the like) that were applied to the qubit between the first time and the interaction time. For example, the quantum operation effect and/or phase change may be due to a Stark shift of the qubit caused by a laser beam being incident on the qubit. The interaction time phase (e.g., the expected/determined phase at the interaction time) of the particular qubit and/or each qubit of the pair/group of qubits may then be determined based on the corresponding immediately previously determined phase of the qubit (e.g., the interaction time phase determined in response to the immediately previously identified phase update trigger corresponding to the particular qubit and/or an initialization step corresponding to the particular qubit), the location and/or transport effect, and the quantum operation effect.

The controller 30 may then cause the phase of the signal to be applied to the particular qubit and/or pair/group of qubits during the scheduled manipulation event to be adjusted to correspond to the interaction time phase of the particular qubit and/or pair/group of qubits. For example, the controller 30 may reset a manipulation source 64, cause the operation of manipulation source 64 to be modified and/or adjusted, and/or the like, such that the phase of the signal generated by manipulation source 64 corresponds to the interaction time phase of the particular qubit at the interaction time (e.g., when the signal interacts with and/or is incident on the particular qubit).

Example of Location and/or Transport Effect Determination

Figure 2A:
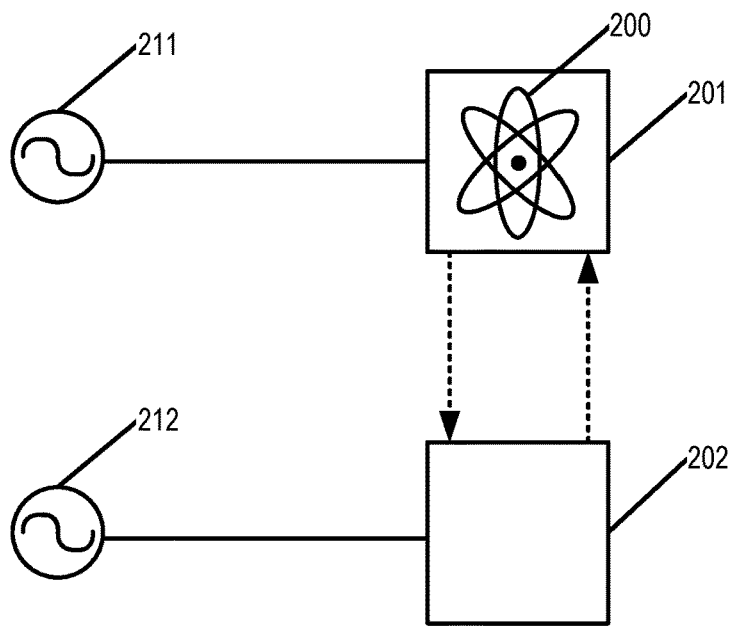
Figure 2B:
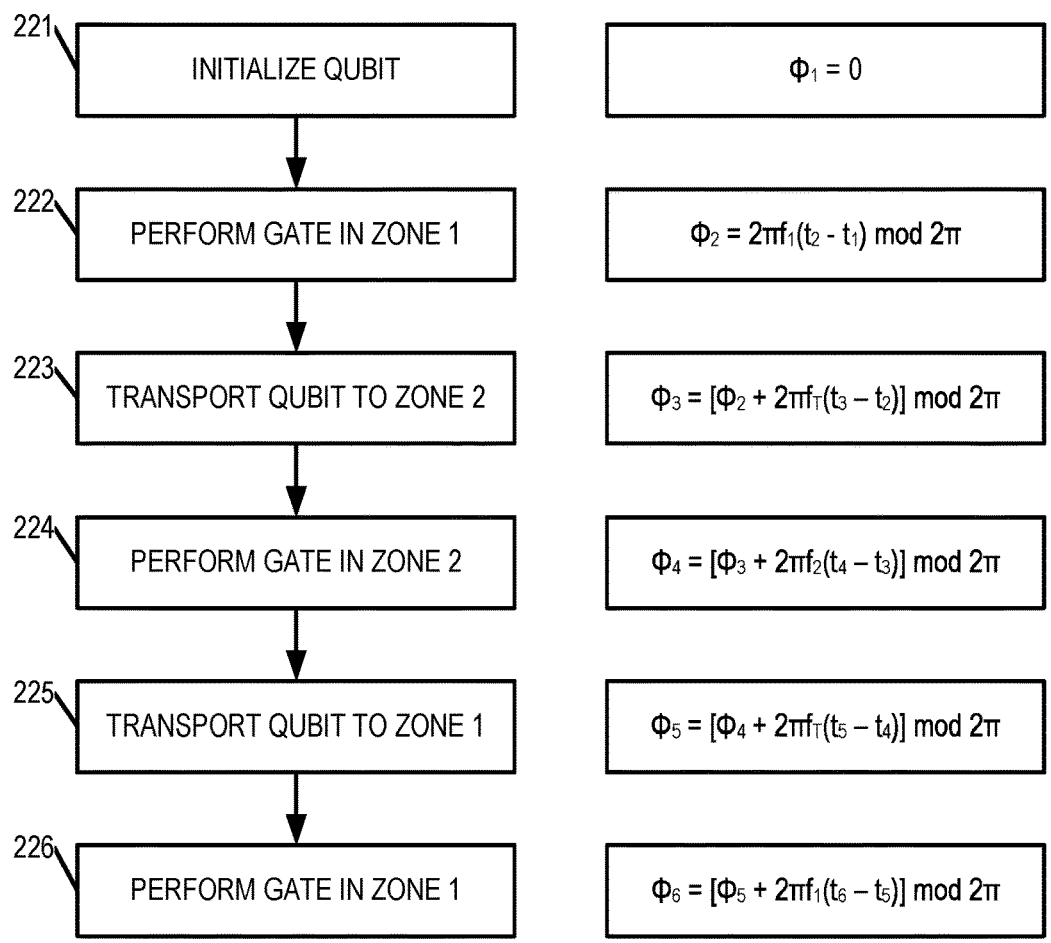

An example of determining location and/or transport effects on the phase of one or more quantum objects will now be described with respect to an example trapped ion quantum computer 110. FIG. 2A provides a schematic diagram of a qubit 200 in a two region ion trap. FIG. 2B provides a flowchart illustrating an example scenario of the qubit 200 being located in the ion trap and transported between regions of the ion trap and the corresponding phases of the qubit 200. In the example scenario provided in FIG. 2B, the gates applied to the qubit 200 do not affect the phase of the qubit. For example, the gates described with respect to FIG. 2B may be microwave gates. However, due to the magnetic field gradient and/or other environmental effects across the ion trap, the phase of the qubit may evolve differently in different regions or regions of the ion trap. As should be understood, the ion trap may have therein a plurality of qubits and the phase of each qubit may be tracked.

In the example scenario, at step/operation 221, the qubit 200 is initialized in a first region 201 of the ion trap at time $t_1$, according to the clock of the controller 30. The qubit 200 is initialized to have a phase $\phi_1=0$. A qubit record (e.g., stored in memory of the controller 30) may be updated to indicate that at time $t_1$, the qubit 200 has phase $\phi_1=0$.

The qubit 200 remains located in the first region 201 and, at time $t_2$, a gate (e.g., quantum operation) is applied to the qubit 200 via first DDS 211, at step operation 222. While in the first region 201, the effective frequency of the qubit 200 is a first frequency $f_1$. The first frequency $f_1$ may be influenced by environmental factors (e.g., applied voltage, experienced magnetic field, temperature, frequency of the first DDS 211, and/or the like) corresponding to the first region 201. Thus, the phase of the qubit 200 at time $t_2$ is given by $\phi_2 = [\phi_1 + 2\phi f_1(t_2-t_1)]$ mod $2\pi$. In various embodiments, the phase is defined modulo $2\pi$. For example, the phase of the qubit 200 at time $t_{i+1}$ is $\phi_{i+1} = [\phi_i + \Delta\phi]$ mod $2\pi$, where $\phi_i$ is the phase of the qubit 200 at the immediately previous time $t_i$ that the qubit record corresponding to the qubit 200 was updated and $\Delta\phi$ is the change in the phase between time $t_i$ and time $t_{i+1}$. As $\phi_1=0$, due the initiation step executed at time $t_1$, the phase of the qubit 200 at time $t_2$ is $\phi_2 = 2\pi f_1(t_2-t_1)$ mod $2\pi$.

Between times $t_2$ and $t_3$, the qubit 200 is transported from the first region 201 to a second region 202, at step/operation 223. During the transport of the qubit 200 from the first region 201 to the second region 202, the frequency of the qubit is given by transport frequency function $F_T$ which is a function of the location of the qubit 200 between the first region 201 and the second region 200. In an example embodiment, the transport frequency function $F_T$ is assumed to be a constant effective transport frequency $f_T$. For example, in various embodiments, the transport frequency function $F_T$ is assumed and/or approximated to be a constant effective transport frequency $f_T$ along the path from the first region 201 to the second region 202. In an example embodiment, the transport frequency function $F_T$ is a function $F_T(x)$, where x is a position between the first region 201 and the second region 202. In general, the accumulated phase of the qubit over the transport operation of transporting the qubit 200 from the first region 201 to the second region 202 is given by $2\pi \int_{t_2}^{t_3} F_T(x)\partial t$. Thus, at time $t_3$ in an example embodiment, where $F_T$ may be approximated as a constant effective transport frequency $f_T$, upon completion of the transport operation of transporting the qubit from the first region 201 to the second region 202, the phase of the qubit 200 is given by $\phi_3 = [\phi_2 + 2\pi f_T(t_3-t_2)]$ mod $2\pi$.

At time $t_4$, a gate is performed on the qubit 200 in the second region 202, at step/operation 224 by a second DDS 212. While in the second region 202, the effective frequency of the qubit 200 is a second frequency $f_2$. In various embodiments, the second frequency $f_2$ is influenced by environmental factors (e.g., applied voltage, experienced magnetic field, temperature, frequency of the second DDS 212, and/or the like) corresponding to the second region 202. In various embodiments, the second frequency $f_2$ may be different from the first frequency $f_1$ and/or the transport frequency $f_T$. Thus, at time $t_4$, the phase of the qubit 200 is $\phi_4 = [\phi_3 + 2\pi f_2(t_4-t_3)]$ mod $2\pi$. While not described in detail herein, a phase correction may be performed (e.g., for a signal generated by the second DDS 212) corresponding to the application of the gate at time $t_4$ to the qubit 200 based on the phase of the qubit at time $t_4$.

In the example scenario, the qubit 200 is transported from the second region 202 to the first region 201 from time $t_4$ to time $t_5$, at step/operation 225. Thus, at time $t_5$, upon completion of the transport operation of transporting the qubit from the second region 202 to the first region 201, the phase of the qubit 200 is given by $\phi_5 = [\phi_4 + 2\pi f_T(t_5-t_4)]$ mod $2\pi$.

At step/operation 226, at time $t_6$, a gate is applied to the qubit 200 in the first region 201. In the example scenario, the qubit 200 stayed in the first region 201, where the effective frequency of the qubit 200 is $f_1$, between time $t_5$ and time $t_6$. Thus, the phase of the qubit 200 at time $t_6$ is $\phi_6 = [\phi_5 + 2\pi f_1(t_6-t_5)]$ mod $2\pi$. In various embodiments, a phase correction may be performed corresponding to the application of the gate to the qubit 200 at time $t_6$. For example, the first DDS 211 may operate at the first frequency $f_1$. Thus, as time has progressed from time $t_1$, when the phase of the first DDS 211 was last adjusted to correspond to the then current phase of the qubit 200, to the time $t_6$, wherein the first DDS 211 is to apply another gate to the qubit 200, the phase $\phi_{source}$ of the first DDS 211 has evolved as $\phi_{source} = 2f_1(t_6-t_1)$ mod $2\pi$. In the same time period, the phase $\phi_{qubit}$ of the qubit 200 has evolved as $\phi_{qubit} = 2\pi[f_1(t_2-t_1) + f_T(t_3-t_2) + f_2(t_4-t_3) + f_T(t_5-t_4) + f_1(t_6-t_5)]$ mod $2\pi$. Thus, if either $f_2 \neq f_1$ mod $2\pi$ or $f_T \neq f_1$ mod $2\pi$, the phase $\phi_{source}$ of the first DDS 211 and the phase $\phi_{qubit}$ of the qubit 200 will not be equal, match, and/or the like. For example, the phase $\phi_{source}$ of the first DDS 211 will be out of sync with the phase $\phi_{qubit}$ of the qubit 200. If it is determined that the absolute value of the difference between the phase $\phi_{source}$ of the first DDS 211 and the phase $\phi_{qubit}$ of the qubit 200 does not satisfy the phase change threshold (e.g., $|\phi_{source} - \phi_{qubit}| \lessdot \Delta\phi_T$), the phase of the first DDS 211 may be adjusted to correspond to, match, and/or approximately equal the phase of the qubit 200. In an example embodiment, the phase of the first DDS 211 may be shifted such that the phase of the first DDS 211 is approximately equal the phase of the qubit 200. In an example embodiment, the phase of the first DDS 211 is set to be approximately equal the phase of the qubit 200.

As described above, in a scenario where there is no quantum operation effect on the phase of the qubit, the phase of the qubit 200 at time $t_{i+1}$ is $\phi_{i+1} = [\phi_i + \Delta\phi]$ mod $2\pi$, where $\phi_i$ is the phase of the qubit 200 at the immediately previous time $t_1$ that the qubit record corresponding to the qubit 200 was updated and $\Delta\phi$ is the change in the phase and/or accumulation of phase between time L and time $t_{i+1}$ due to the location of the qubit 200 and/or the transport of the qubit 200 between regions. Thus, in a scenario where there is not quantum operation effect on the phase of the qubit, the location and/or transportation effect on the phase of the qubit is $\Delta\phi$.

Example of Quantum Operation Effect Determination

Figure 3:
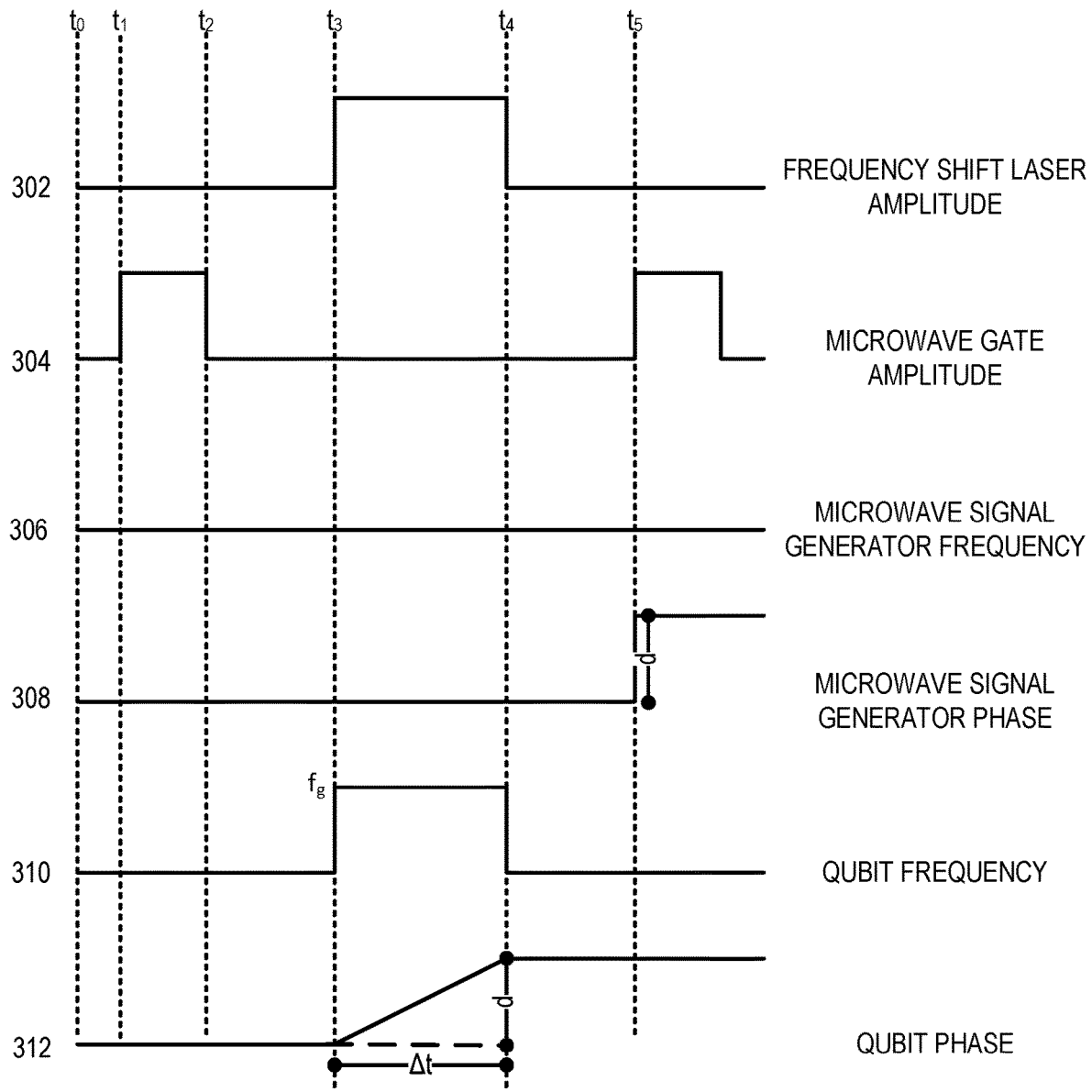

An example of determining a quantum operation effect on one or more quantum objects will now be described with respect to an example trapped ion quantum computer 110. FIG. 3 provides a schematic diagram illustrating an example of determining a quantum operation effect on the phase of a qubit and correcting the phase of a signal generated by a manipulation source (e.g., to apply a gate to the qubit). In the illustrated scenario, the qubit is initialized at time $t_0$. Between times $t_1$ and $t_2$, a microwave gate is applied to the qubit, as shown by line 304. For example, a microwave pulse may interact with the qubit between from time $t_1$ to time $t_2$. The frequency of the microwave signal generator frequency is constant throughout, as shown by line 306. As shown in lines 310 and 312, the application of the microwave gate to the qubit does not affect the qubit phase or the qubit frequency.

From time $t_3$ to time $t_4$ a laser beam and/or pulse generated by a frequency shift laser may be incident on and/or interact with the qubit, as shown by line 302. For example, between times $t_3$ and $t_4$, a frequency shift laser may emit a signal that interacts with the qubit. In an example embodiment, a frequency shift laser is a laser that, when a laser beam, pulse, and/or signal generated by the laser interacts with the qubit, the frequency of the qubit is shifted. For example, when a laser beam, pulse, and/or signal generated by a frequency shift laser interacts with the qubit, the qubit experiences a Stark shift. For example, as shown by line 310, from time $t_3$ to time $t_4$ the frequency of the qubit is shifted from its unshifted frequency $f_0$ to an operation-induced frequency, which is different from and/or not equal to the unshifted frequency $f_0$. For example, the interaction of the laser beam, laser pulse, and/or signal generated by the frequency shift laser may shift the frequency of the qubit by a shift value $f_g$, such that the shifted frequency of the qubit is $f_0+f_g$. For example, as shown by line 312, during the time (e.g., between times $t_3$ and $t_4$) that the laser beam, laser pulse, and/or signal generated by the frequency shift laser interacts with the qubit, the phase of the qubit evolves differently from when the qubit is not interacting with the laser beam, laser pulse, and/or signal generated by the frequency shift laser. For example, as the qubit interacts with the laser beam, laser pulse, and/or signal generated by the frequency shift laser, the phase of the qubit evolves, between times $t_3$ and $t_4$, according to $(f_0+f_g)\Delta t = f_0\Delta t + f_g\Delta t = f_0\Delta t + p$, where $\Delta t = t_4 - t_3$. In contrast, if the qubit had not interacted with the laser beam, laser pulse, and/or signal generated by the frequency shift laser (e.g., if the frequency of the qubit had remained at the unshifted frequency) the phase of the qubit would evolved between times $t_3$ and $t_4$, according to $f_0\Delta t$.

For example, as shown by a comparison of lines 306 and 310, the microwave signal generator frequency and the qubit frequency are consistent with one another at all times when the qubit is not interacting with the laser beam, laser pulse, and/or signal generated by the frequency shift laser (e.g., times other than the time between $t_3$ and $t_4$). For example, as shown in lines 308 and 312, the microwave signal generator phase and the qubit phase are consistent with one another from time $t_0$ until time $t_3$. Then, between times $t_3$ and $t_4$, when the qubit is interacting with the laser beam, laser pulse, and/or signal generated by the frequency shift laser, the phase of the qubit shifts, with respect to the microwave signal generator phase, such that a difference of p exists between the qubit phase and the microwave signal generator phase at time $t_4$.

At time $t_5$, a second microwave gate is applied to the qubit, as shown in line 304. The microwave signal source phase is adjusted so that the second microwave gate is applied to the qubit such that the phase of the microwave signal source corresponds to the phase of the qubit at time $t_5$. For example, at some point between time $t_4$ and $t_5$, a phase update trigger corresponding to the qubit and corresponding to an interaction time of time $t_5$ may be identified by the controller 30. Responsive to identifying the phase update trigger corresponding to the qubit and corresponding to the interaction time of time $t_5$, the controller may determine the quantum operation effect of applying the laser beam, laser pulse, and/or signal generated by the frequency shift laser to the qubit on the phase of the qubit. For example, the controller 30 may determine that applying the laser beam, laser pulse, and/or signal generated by the frequency shift laser to the qubit resulted in a phase shift of $p=(f_0+f_g)\Delta t - f_0\Delta t = f_g\Delta t$. Thus, the microwave signal generator phase may be shifted by a phase shift of p when for applying microwave gate to the qubit at time $t_5$. For example, as shown by line 308, the microwave signal generator phase is shifted by p such that the signal provided by the microwave signal generator (e.g., acting as the second microwave gate) has a phase corresponding to the phase of the qubit at the interaction time (e.g., time $t_5$).

Thus, FIG. 3 provides an example of determining a quantum operation effect on the phase of a qubit and shifting a phase and/or resetting a phase of a manipulation source (e.g., the microwave signal generator in the illustrated example) such that, at an interaction time, the signal generated by the manipulation source and the qubit interacting with the signal have corresponding phases.

Exemplary Real-Time or Near Real-Time Phase Tracking and Correction

Figure 4:
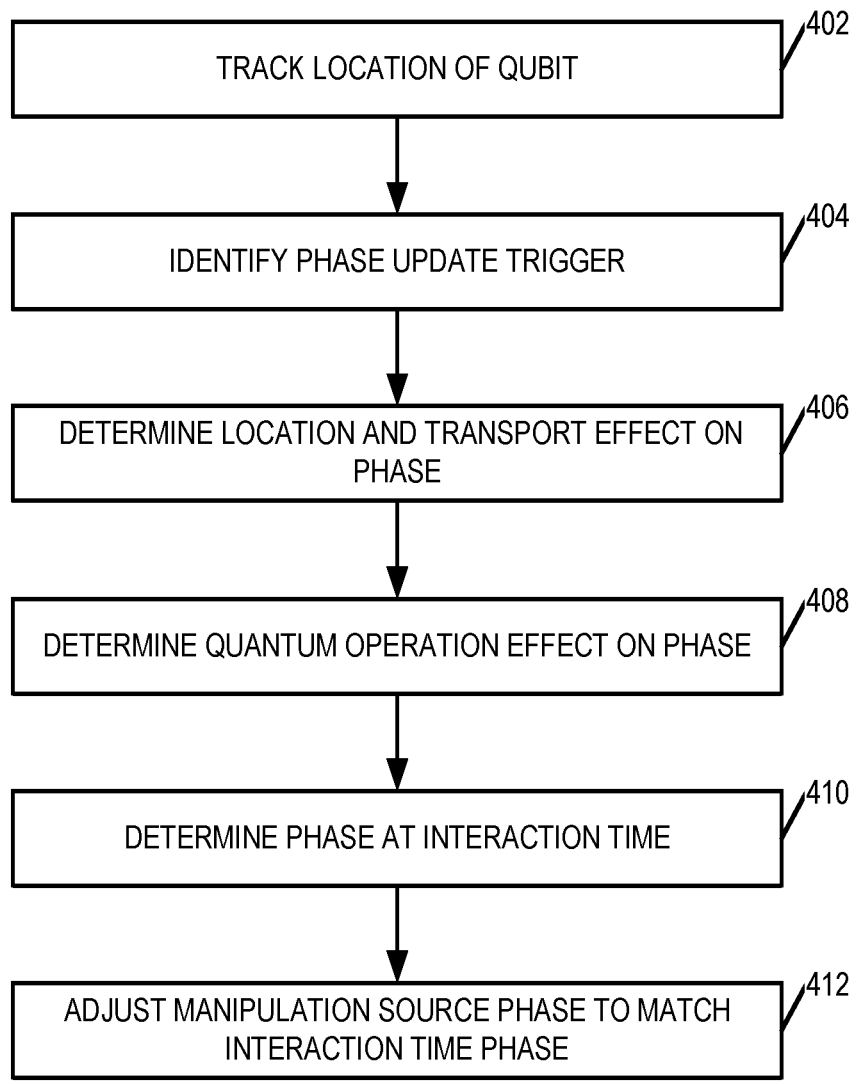
FIG. 4 is a flowchart illustrating example processes, procedures, and/or operations performed, for example, by a controller such as that shown in FIG. 8, for tracking the phase of a qubit and correcting the phase of a signal to be applied to the qubit, in accordance with an example embodiment.

In various embodiments, to perform real-time and/or near real-time phase tracking and correction includes tracking the location and/or transport effects and quantum operation effects on one or more quantum objects. FIG. 4 provides a flowchart illustrating various processes, procedures, operations, and/or the like for performing real-time or near real-time phase tracking and correction, according to various embodiments where the example quantum system is part of the trapped ion quantum computer 110. In various embodiments, a controller 30 corresponding to the quantum system may perform phase tracking and correction with regards to quantum objects of the quantum system and manipulation sources of the quantum system. For example, in various embodiments, the real-time or near real-time phase tracking and correction is performed by a controller 30 of a trapped ion quantum computer 110 to track the phase of qubits of the trapped ion quantum computer 110 and adjust the phase of signals generated by manipulation sources 64 (e.g., lasers, voltage sources, DDS, and/or the like) and/or the phase of the manipulation sources 64 such that when a signal generated by a manipulation source interacts with a qubit, the phase of the signal corresponds to the phase of the qubit.

Figure 4A:
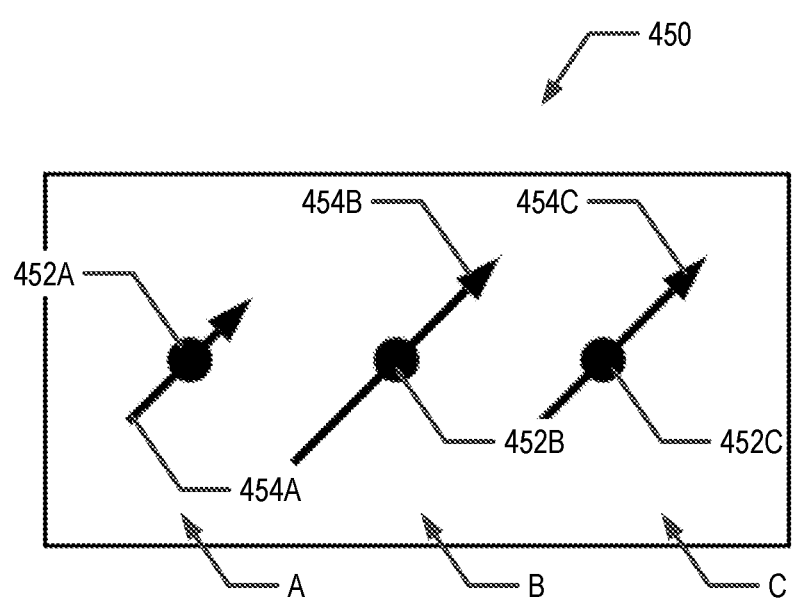
FIG. 4A is a diagram illustrating how environmental effects experienced by quantum objects may differ based on the location of the quantum object within the quantum system.

FIG. 4A illustrates an example quantum system 450 where the environmental effects (e.g., magnetic field and/or other environmental effects) change across the quantum system 450. A first quantum object 452A in a region A of the quantum system 450 experiences a first magnetic field 454A. A second quantum object 452B in a region B of the quantum system 450 experiences a second magnetic field 454B and a third quantum object 452C in a region C of the quantum system 450 experiences a third magnetic field 454C. As shown in FIG. 4A, the first, second, and third magnetic fields 454A, 454B, 454C are different. For example, the first, second, and third magnetic fields 454A, 454B, 454C may differ in direction and/or amplitude. Thus, as shown in FIG. 4A, environmental effects may vary across the quantum system 450. Additionally, as noted above, quantum operations (e.g., gates) performed and/or enacted on one or more quantum objects may also affect the phases of the one or more quantum objects. Thus, both location and/or transport phase effects and quantum operation phase effects are tracked and/or corrected for in various embodiments.

Starting with FIG. 4 at step/operation 402, after the initialization of one or more qubits within the ion trap 50, the location of each qubit within the ion trap 50 of the trapped ion quantum computer is tracked. For example, the controller 30 may track which region of the ion trap 50 each of one or more qubits is located in, an amount of time the qubit is located within that region (e.g., based on the clock of the controller 30), the amount of time the qubit is in transport between regions (e.g., based on the clock of the controller 30), quantum operations applied to the qubit, and/or the like. For example, the controller 30 may receive computer-executable instructions, commands, and/or the like from the system computing entity 20. The controller 30 may then schedule the executable instructions, commands, and/or the like (e.g., in the controller's 30 executable queue) to be performed at particular times (e.g., based on the clock of the controller 30). The controller 30 may then execute the executable instructions, commands, and/or the like in the controller's executable queue at the scheduled particular times.

In various embodiments, the controller 30 stores a qubit record (e.g., in memory 810 of the controller 30) for each of the one or more qubits in the ion trap 50. For example, each qubit within the ion trap 50 may be associated with a qubit identifier. A qubit record storing location and/or transport information/data, phase accumulation information/data, quantum operation information/data, and/or the like and indexed by the qubit identifier may be stored for each of the one or more qubits within the ion trap 50. The controller 30 may update the qubit record (e.g., stored in memory 810 of the controller 30) corresponding to a particular qubit (e.g., indexed by the qubit identifier corresponding to the particular qubit) each time the particular qubit is acted upon (e.g., transported from one region to another region, a quantum operation is applied thereto, and/or the like) to accumulate the phase of the particular qubit, update location and/or transport information/data for the particular qubit (e.g., an amount of time a qubit was located within a region, which region the qubit was located in, the amount of time the qubit was being transported between regions, and/or the like), quantum operation information/data for the particular qubit (e.g., what quantum operations were applied to the qubit, how the quantum operations were applied to the particular qubit, and/or the like). In various embodiments, the phase information/data of the qubit record may be updated responsive to the identification of a phase update trigger corresponding to the particular qubit.

In an example embodiment, the qubit record may be a log of all activity corresponding to a particular qubit performed during a session of operating the quantum computer 110. In an example embodiment, the qubit record may indicate times at which the phase of the qubit has been updated such that the next time the phase of the qubit is updated, the update may be performed from the immediately previous update moving forward (e.g., rather than having to update the phase of the qubit starting from when the qubit was initiated). In an example embodiment, the qubit record is rewritten when a phase update is performed. For example, each time a phase update is performed for a particular qubit, the corresponding qubit record is wiped clean and restarted.

At step/operation 404, a phase update trigger is identified by the controller 30. In various embodiments, the phase update trigger corresponds to one or more qubits (e.g., which may include a particular qubit that is to be acted on in a particular manner) and, possibly, an interaction time. In various embodiments, a phase update trigger corresponding to a particular qubit is identified responsive to the scheduling (e.g., by the controller 30) the execution of computer-executable instructions, commands, and/or the like corresponding to and/or causing the occurrence of a manipulation event (e.g., the application of one or more signals (e.g., generated by one or more manipulation sources 64) to the particular qubit) at an interaction time. In an example embodiment, a phase update trigger corresponding to the particular qubit is identified responsive determining (e.g., by the controller 30) that computer-executable instructions, commands, and/or the like corresponding to and/or causing the occurrence of a manipulation event (e.g., the application of one or more signals (e.g., generated by one or more manipulation sources 64) to the particular qubit) are scheduled to be executed at an interaction time that is within a time threshold of the current time (e.g., as determined by the clock). In an example embodiment, a phase update trigger corresponding to the particular qubit may be identified response to determining (e.g., by the controller 30) that the next set/group of computer-executable instructions, commands, and/or the like corresponding to and/or causing the occurrence of a manipulation event scheduled to be executed by the controller 30 will cause the application of a signal and/or a quantum operation to the particular qubit. In an example embodiment, a phase update trigger may be identified corresponding to a particular qubit or a particular region of the ion trap 50. For example, the phase update trigger may indicate that a phase accumulation/update should be performed for all qubits located within a particular region of the ion trap 50 (e.g., based on the corresponding qubit records). In an example embodiment, such a s phase update trigger (e.g., corresponding to a particular region of the ion trap 50) may be identified in response to a gate being applied to one or more qubits within the particular region of the ion trap 50.

Thus, in various embodiments, the controller 30 may identify a phase update trigger corresponding to one or more qubits (e.g., including the particular qubit) and, possibly, corresponding to an interaction time based on the computer-executable instructions, commands, and/or the like scheduled to be executed by the controller 30. Each set/group of computer-executable instructions, commands, and/or the like are scheduled to be performed at an interaction time corresponding to the manipulation event. The scheduled interaction time for the execution of the computer-executable instructions, commands, and/or the like corresponding to and/or causing the manipulation event is extracted from the controller's 30 execution queue and associated with the identified phase update trigger as the interaction time associated with and/or corresponding to the identified phase update trigger. A qubit identifier that identifies the particular qubit that is the subject of the manipulation event is extracted from the computer-executable instructions, commands, and/or the like and associated with the identified phase update trigger to identify the particular qubit associated with and/or corresponding to the identified phase update trigger. When the phase update trigger corresponds to a particular region of the ion trap, the controller may query the qubit records to determine which qubits are located within the particular region and identify those qubits corresponding to qubit records indicating that qubit is located within the particular region as being associated with and/or corresponding to the identified phase update trigger.

At step/operation 406, a location and/or transport effect on the phase of each of the one or more qubits (e.g., including the particular qubit) may be determined by the controller 30. For example, the controller 30 may use the location and/or transport information/data stored in the qubit record corresponding to the particular qubit to determine the location and/or transport effect on the phase of the particular qubit in the time period between when the phase information/data stored in the qubit record corresponding to the particular qubit was last updated and the interaction time. For example, as described above, the location and/or transport effect on the phase of the particular qubit may be determined by multiplying the amount of time the particular qubit spent in a particular region or being transported between regions by the frequency of the particular qubit when in the particular region or when being transported between regions and summing over each region and/or transport between regions that occurred in the time period between when the phase information/data stored in the qubit record corresponding to the particular qubit was last updated and the interaction time. The amount of time the particular qubit spent in a particular region and an identifier of the particular region and the amount of time the particular qubit spent being transported between regions is provided by the location and/or transport information/data of the qubit record. To determine the frequency of the particular qubit when in the particular region or when being transported between regions may be determined based on a calibrated table.

In various embodiments, the controller 30 may store (e.g., in memory 810) a calibrated table that indicates a region frequency for each region of the ion trap 50. In an example embodiment, a region frequency of a region is the frequency of a qubit when the qubit is located within the region. In various embodiments, the magnetic field gradient and/or other environmental effects may cause the region frequency of a first region to be different than the region frequency of a second region that neighbors and/or is adjacent to the first region. In various embodiments, the calibrated table indicates a transportation frequency for each adjacent pair of regions. In an example embodiment, a transportation frequency corresponding to a first region and an adjacent and/or immediately neighboring second region is the frequency of a qubit when the qubit is being transported from the first region to the second region. In an example embodiment, the transportation frequency is given as a function of time and/or distance along the transportation path from the first region to the adjacent and/or immediately neighboring second region. In such an embodiment, the transportation frequency may be integrated over the transportation path to determine the effect of transporting a qubit from the first region to the second region on the qubit's phase.

In various embodiments, the calibrated table is calibrated on a periodic and/or regular basis. For example, the calibrated table may be generated, updated, populated, and/or the like based on sensor measurements captured by calibration sensors 62 (e.g., 62A, 62C) coupled to the quantum computer 110. For example, a calibration sensor 62 may be coupled to the quantum computer 110 such that the calibration sensor 62 monitors one or more operational characteristics of a manipulation source and/or a signal generated by a manipulation source and provides a signal indicative of the monitored operational characteristic(s) to the controller 30. In various embodiments, the calibration sensors 62 may be frequency sensors, voltage sensors, power sensors, and/or the like. For example, the frequency of a voltage source may be determined by a calibration sensor 62 coupled to the voltage source. Similarly, the power of a signal (e.g., generated by a manipulation source 64) may be determined by a calibration sensor 62 coupled to the manipulation source 64, signal path 66, and/or the like corresponding to the signal. For example, the calibrated table may be generated, updated, populated, and/or the like at the beginning of each operation session of the quantum computer 110 (e.g., each time quantum objects are added to the ion trap 50, at the beginning of executing a quantum algorithm, and/or the like). In an example embodiment, the calibration table is updated, re-populated, and/or the like periodically during the operation of the quantum computer 110 (e.g., every thirty seconds, minute, two minutes, five minutes, ten minutes, fifteen minutes, and/or the like). Thus, any drift in power, voltage, frequency, and/or the like of the manipulation sources and/or signals generated thereby may be monitored and accounted for within the information/data stored in the calibration table.

At step/operation 408, the quantum operation effect on the phase of the particular qubit due to any quantum operation applied to the particular qubit since the phase information/data in the qubit record corresponding to the particular qubit was last updated is determined by the controller 30. For example, the controller 30 may identify any quantum operation applied to the particular qubit since the phase information/data in the qubit record corresponding to the particular qubit was last updated based on the quantum operation information/data of the qubit record. The effect of any identified quantum operations on the phase of the particular qubit may then be determined. For example, a Stark shift caused by any identified quantum operations may be determined. In an example embodiment, the determination of the quantum operation effect includes accessing information/data from the calibration table. For example, the Stark shift experienced by a qubit due to a laser beam being incident thereon is dependent on the power delivered to the qubit by the laser beam. Therefore, in an example, the power of a signal applied to the particular qubit to apply the quantum operation may be accessed from the calibration table.

At step/operation 410, the phase of the particular qubit at the interaction time is determined by the controller 30. For example, the controller 30 may use the determined location and/or transportation effect $\Delta\phi_{LT}$, the determined quantum operation effect $\Delta\phi_{QO}$, and the previous phase $\phi_i$ of the particular qubit from the phase information/data of the qubit record corresponding to the particular qubit to determine the interaction time phase $\phi_{i+1}$ of the particular qubit (e.g., the phase of the particular qubit at the interaction time) $\phi_{i+1}= [\phi_i + \Delta\phi_{LT} \Delta\phi_{QO}]$ mod $2\pi$. In an example embodiment, the phase of a manipulation source and/or a signal generated by the manipulation source at the interaction time may also be determined. For example, in an example embodiment in which the phase of the manipulation source and/or signal generated thereby is shifted (e.g., rather than set), the phase of the manipulation source and/or signal generated thereby at the interaction time is determined such that a phase shift may be determined. For example, the phase shift is the change in phase with which the phase of the manipulation source and/or signal generated thereby needs to be shifted to correspond to, match, and/or be approximately equal to the phase of the particular qubit at the interaction time (e.g., when the signal interacts with the particular qubit).

At step/operation 412, the controller 30 causes the phase of the manipulation source 64 and/or a signal generated by the manipulation source 64 to be adjusted such that the phase of the signal generated by the manipulation source 64 corresponds to the interaction time phase when the signal interacts with the particular qubit at the interaction time. For example, the controller 30 may set the phase of the manipulation source 64 and/or a signal generated thereby (e.g., via a driver controller element 815) such that the phase of the manipulation source 64 and/or the signal generated there by will correspond to, match, and/or be approximately equal to the interaction time phase of the particular qubit when the signal interacts with the particular qubit at the interaction time. For example, the controller 30 may shift the phase of the manipulation source 64 and/or a signal generated thereby (e.g., based on a phase shift determined in step/operation 410 and/or via a driver controller element 815) such that the phase of the manipulation source 64 and/or the signal generated there by will correspond to, match, and/or be approximately equal to the interaction time phase of the particular qubit when the signal interacts with the particular qubit at the interaction time. For example, the controller 30 may cause a voltage to be applied to a manipulation source 64 and/or a driver corresponding to a manipulation source 64 (e.g., via driver controller element 815) that causes the phase of the manipulation source 64 and/or of a signal generated by the manipulation source 64 to be adjusted such that the phase of the signal generated by the manipulation source 64 corresponds to the interaction time phase when the signal interacts with the particular qubit at the interaction time. The controller 30 may then execute the computer-executable instructions, commands, and/or the like at the interaction time causing the manipulation event to occur (e.g., a signal is generated by the manipulation source and the signal interacts with the particular qubit) such that the phase of the signal and the phase of the particular qubit correspond, match, and/or approximately equal to one another.

In various embodiments, the phase of the manipulation source 64 and/or a signal generated by the manipulation source 64 is adjusted such that the phase of the signal generated by the manipulation source 64 corresponds to the interaction time phase when the signal interacts with the particular qubit at the interaction time when the signal is enacting a single qubit gate on a qubit. In various embodiments where the controller 30 is configured to enact phase insensitive two qubit gates, the phase of the manipulation source 64 and/or a signal generated by the manipulation source 64 is not adjusted when the signal is enacting a two or more qubit gate on two or more qubits. However, the Stark shift (or other phase shift) provided to the two or more qubits by the action of the two qubit gate is tracked for future reference. In various embodiments where the controller 30 is configured to enact phase sensitive two qubit gates, two or more manipulation sources 64 may be used to each provide a signal which addresses a single qubit being acted on by the two or more qubit gate. The phase of a manipulation source 64 and/or the signal generated by the manipulation source 64 may be adjusted such that the phase of the signal generated by the manipulation source 64 corresponds to the interaction time phase of the qubit being acted on by the two or more qubit gate that is being addressed by that manipulation source 64 when the signal interacts with that qubit. In various embodiments where the controller 30 is configured to enact phase sensitive two qubit gates, one or more corrective pulses may be used to address and/or correct for the difference in phases of the two or more qubits being acted on by the two or more qubit gate.

In various embodiments, the identification of the phase update trigger, determination of location and/or transportation effect, determination of the quantum operation effect, determination of the interaction time phase, and causing the phase of the manipulation source 64 and/or a signal generated thereby to be adjusted are performed in real-time and/or near real-time with respect to one another. In particular, the interaction time phase of the particular qubit is determined during the operation of the quantum computer 110 (e.g., during the execution of a quantum algorithm). For example, the interaction time phase of a particular qubit may be determined in real-time or near real-time with respect to the occurrence of a manipulation event to which the particular qubit is a party. The real-time or near real-time determination of the interaction time phase of a particular qubit (with respect to a manipulation event involving the particular qubit) enables the quantum algorithm being executed to be branched and/or modified during the execution of the quantum algorithm, in various embodiments. For example, the quantum algorithm may be modified on the fly. Additionally, in various embodiments, the determination of the interaction time phase of a particular qubit (with respect to a manipulation event involving the particular qubit) based on the periodically updated calibration table enables the interaction time phase to be more accurately determined because any drift in the manipulation sources is accounted for by the information/data stored in the calibration table. Moreover, in various embodiments, the interaction time phase is determined based on both the location and/or transportation effect and the quantum operation effect, allowing for a more accurate determination of the interaction time phase. By more accurately determining the interaction time phase, the manipulation source 64 may be operated to provide a signal having a phase that more accurately corresponds to, matches, and/or is approximately equal to the actual phase of the particular qubit (e.g., the threshold phase difference $\Delta\phi_T$ can be smaller) leading to improved qubit coherence, qubit gate fidelity, and a lower overall quantum computer error rate.

Example Scenario

FIG. 5 illustrates an example scenario of performing single and two qubit gates on four qubits, according to an example embodiment. In the illustrated example scenario, the quantum system is part of a trapped ion quantum computer 110 and the quantum objects are ions within ion trap 50. The example scenario is enacted in an ion trap 50 having sections A, B, C, D, E, F, and G. In the example scenario, time is taken to advance only during application of only during quantum operations (e.g., transport operations, single qubit gate operations, two qubit gate operations, state preparation operations, measurement operations, and/or the like). Various commands may be executed by the processing device 805 to update qubit records, each corresponding to a qubit in the of the quantum computer 110, stored in memory 810.

In the example scenario illustrated in FIG. 5, the controller 30 is configured to use a plurality of operations and/or commands, including Configure, Transport, StatePrep, SQGate, and TQGate. In various embodiments, a Measure command may also be used. The Configure command takes the location of each qubit and the frequency of each section of the trap 50 as arguments and, when executed (e.g., by processing device 805), sets the initial qubit sections (e.g., the section of the ion trap 50 that each qubit is located in), initializes the qubit phase accumulator $\Delta\phi_q$ (e.g., where the subscript q indicates the particular qubit (e.g., 0, 1, 2, or 3 in this example)), and the frequencies fs in each section of the ion trap 50 (e.g., where the S subscript indicates the particular section of the ion trap 50 (e.g., A, B, C, D, E, F, or G in this example)). For example, the current location of a qubit, immediately previous location of a qubit, and the qubit phase accumulator of the qubit may be updated/initialized in the corresponding qubit record. The Transport command takes the section in which each qubit is located after the transport operation is completed as arguments and, when executed (e.g., by processing device 805), causes each qubit record to be updated such that the current location of the qubit indicates the section indicated by the Transport command arguments and, if the qubit has moved regions, the immediately previous location of the qubit is updated accordingly. In various embodiments, execution of the Transport command (e.g., by the processing device 805) may cause the qubit phase accumulator $\Delta\phi_q$ of one or more qubit records to be updated based on the transport operation performed. The StatePrep command takes the sections of the ion trap 50 that are to be acted on by a state preparation operation and, when executed (e.g., by processing device 805), causes the qubit records of qubits located in the indicated sections to be updated to set the qubit phase accumulator $\Delta\varphi_q$ of the qubit record to 0 (e.g., to initialize the qubit phase accumulator). The SQGate command takes the section(s) in which single qubit gates are to be enacted, a $\Theta$ value corresponding to one or more parameters of the gate that may be set and/or configured by the designer and/or programmer of a quantum circuit and/or algorithm, and a phase optimization value $\Phi$ that is parameter of the single qubit gate. In various embodiments, the phase optimization value $\Phi$ may be added to the qubit phase accumulator $\Delta\varphi_q$ of a qubit record corresponding to qubit to be acted on by the single qubit gate in determining the interaction time phase of the qubit and determining a phase correction for the gate. In various embodiments, the qubit phase accumulator $\Delta\varphi_q$ of a qubit record corresponding to qubit to be acted on by the single qubit gate may be adjusted by the phase optimization value $\Phi$ to prevent the need of additional operations to be performed on the qubit (e.g., phase correction operations, rotations of the qubit vector on the Bloch sphere to adjust for various phase effects of the gate, and/or the like). Execution of the SQGate command (e.g., by processing device 805) causes the qubit phase accumulator $\Delta\varphi_q$ of the qubit record corresponding to qubit acted on by the single qubit gate to be updated based on the Stark shift or other quantum operation effect that affects the phase of the qubit acted upon by the single qubit gate. The TQGate command takes the section(s) in which two qubit gates are to be enacted as arguments. Execution of the TQGate command (e.g., by processing device 805) causes the qubit phase accumulator $\Delta\varphi_q$ of the qubit record corresponding to qubit acted on by the two qubit gate to be updated based on the Stark shift or other quantum operation effect that affects the phase of the qubits acted upon by the two qubit gate. In various embodiments, execution of a Transport, SQGate, and/or TQGate command may cause the qubit phase accumulator $\Delta\varphi_q$ of the qubit record(s) corresponding to one or more qubits to be updated based on the time since a previous command was executed.

For example, at time $t_1$, a Configure command may be executed (e.g., by the processing device 805) to initialize the location of the qubits and reset the qubit phase accumulator $\Delta\varphi_q$ of the qubit records corresponding to the qubits. The Configure command may also set the frequencies of each section (e.g., determined based on a performed calibration).

At time $t_2$, a Transportation command may be executed (e.g., by the processing device 805). For example, the Transportation command may cause the qubit records corresponding to qubit 0 and qubit 2 to be updated based on qubits 0 and 2 changing sections within the ion trap 50.

At time $t_3$, a StatePrep command may be executed (e.g., by the processing device 805). The StatePrep command may act on qubits located in particular sections of the ion trap 50 (e.g., sections B and F) to set the qubit phase accumulator $\Delta\varphi_q$ of the qubit records corresponding to qubits located in sections B and F to zero and/or indicating that the qubit phase accumulator $\Delta\varphi_q$ of the qubit records corresponding to qubits located in sections B and F are ready and/or enabled to be updated/accumulated. For example, the qubit phase accumulator $\Delta\varphi_q$ of the qubit records corresponding to qubits 0 and 2, which are located in sections B and F, respectively, may be set to zero and/or the qubit records corresponding to qubits 0 and 2 may be updated to indicate that the qubit phase accumulator $\Delta\varphi_q$ of the qubit records are ready and/or enabled to be updated/accumulated.

At time $t_4$, a SQGate command is executed (e.g., by the processing device 805). For example, the SQGate command may cause the determination of an interaction time phase (phase$_q$) of each qubit to be acted upon by the one or more single qubit gates (e.g., qubits 0 and 2 which are located in sections B and F). For example, the interaction time phase for qubit 0 may be determined as $\Delta\varphi_0 + \varphi_m$, which is a phase corresponding to the section B in which qubit 0 is located. For example, $\varphi_m = f_B^*(t_4 - t_3)$, in an example embodiment, where $f_B$ is the well frequency in section B. Similarly, the interaction time phase for qubit 2 may be determined as $\Delta\varphi_2 + \varphi_n$, which is $\varphi_n = f_F^*(t_4 - t_3)$, in an example embodiment, where $f_F$ is the well frequency in section F. After the single qubit gate is completed and/or as a result of executing the SQGate command, the qubit phase accumulators $\Delta\varphi_q$ of qubit records corresponding to qubits located within the section(s) acted upon by the single qubit gate are updated to include a Stark shift or other quantum operation effect accumulated by the qubits as a result of being acted upon by the single qubit gate.

At time $t_5$, a Transport command may be executed (e.g., by the processing device 805). For example, the Transport command may cause the qubit records corresponding to qubits 0, 1, 2, and 3 to be updated based on the qubits changing sections and/or being transported within the ion trap 50. In an example embodiment, prior to the updating of the location of each qubit based on execution of the Transport command, the qubit phase accumulators $\Delta\varphi_q$ of each qubit record are updated to account for the location effect of the qubits being located in particular sections during the time that the single qubit gate was being performed. For example, the qubit phase accumulators $\Delta\varphi_q$ for qubit 0 and qubit 2 may be increased by $(t_4 - t_3)^* f_B$ and $(t_4 - t_3)^* f_F$, respectively. Execution of the Transport command may further cause the qubit phase accumulator $\Delta\varphi_q$ of each qubit record to be updated based on the transporting of the qubits across one or more sections of the ion trap. For example, the qubit phase accumulators $\Delta\varphi_q$ for qubit 0 and qubit 2 may be increased by $2\pi f_T^*(t_5 - t_4)$. In an example embodiment, $f_T$ may correspond to a particular pair of sections of the ion trap 50.

At time $t_6$, a StatePrep command may be executed (e.g., by the processing device 805). The StatePrep command may act on qubits located in particular sections of the ion trap 50 (e.g., sections B and F) to set the qubit phase accumulator $\Delta\varphi_q$ of the qubit records corresponding to qubits located in sections B and F to zero and/or indicating that the qubit phase accumulator $\Delta\varphi_q$ of the qubit records corresponding to qubits located in sections B and F are ready and/or enabled to be updated/accumulated. For example, the qubit phase accumulator $\Delta\varphi_q$ of the qubit records corresponding to qubits 1 and 3, which are located in sections B and F, respectively, may be set to zero and/or the qubit records corresponding to qubits 1 and 3 may be updated to indicate that the qubit phase accumulator $\Delta\varphi_q$ of the qubit records are ready and/or enabled to be updated/accumulated. Additionally, execution of the StatePrep command may cause the qubit phase accumulators $\Delta\varphi_q$ of qubits 0 and 2 to be updated based on location effects. For example, the qubit phase accumulators $\Delta\varphi_q$ of qubits 0 and 2 may be incremented by the values $(t_6 - t_5)^* f_A$, $(t_6 - t_5)^* f_E$, respectively.

At time $t_7$, a SQGate command is executed (e.g., by the processing device 805). For example, the SQGate command may cause the determination of an interaction time phase (phase$_q$) of each qubit to be acted upon by the one or more single qubit gates (e.g., qubits 1 and 3 which are located in sections B and F). For example, the interaction time phase for qubit 1 may be determined as $\Delta\varphi_0 + \varphi_m$, which is a phase corresponding to the section B in which qubit 1 is located.

For example, $\varphi_m = f_B^*(t_7-t_6)$, in an example embodiment, where $f_B$ is the well frequency in section B. Similarly, the interaction time phase for qubit 3 may be determined as $\Delta\varphi_2 + \varphi_n$, which is $\varphi_n = f_F^*(t_7-t_6)$, in an example embodiment, where $f_F$ is the well frequency in section F. After the single qubit gate is completed and/or as a result of executing the SQGate command, the qubit phase accumulators $\Delta\varphi_q$ of qubit records corresponding to qubits located within the section(s) acted upon by the single qubit gate are updated to include a Stark shift or other quantum operation effect accumulated by the qubits as a result of being acted upon by the single qubit gate.

At time $t_8$, a Transport command may be executed (e.g., by the processing device 805). For example, the Transport command may cause the qubit records corresponding to qubits 0, 1, 2, and 3 to be updated based on the qubits changing sections within the ion trap 50. In an example embodiment, prior to the updating of the location of each qubit based on execution of the Transport command, the qubit phase accumulators $\Delta\varphi_q$ of each qubit record are updated to account for the location effect of the qubits being located in particular sections during the time that the single qubit gate was being performed. For example, the qubit phase accumulator $\Delta\varphi_q$ for qubit 0 may be incremented by the value $f_A^*(t_7-t_6)$. Execution of the Transport command may further cause the qubit phase accumulator $\Delta\varphi_q$ of each qubit record to be updated based on the transporting of the qubits across one or more sections of the ion trap. For example, the qubit phase accumulator $\Delta\varphi_q$ for qubit 0 may be incremented by the value $2\pi f_T^*(t_8-t_7)$.

At time $t_9$, a TQGate command is executed (e.g., by the processing device 805). The TQGate command corresponds to two qubit gates that are being performed in sections B and F. In the illustrated scenario, phase insensitive two qubit gates are used, and thus the interaction time phase need not be determined. However, execution of the TQGate command causes the qubit phase accumulator $\Delta\varphi_q$ of each qubit record corresponding to a qubit located in sections B and F to be updated based on the Stark shift or other quantum operation effect that affected the phase of the qubit as a result of the two qubit gate being performed on the qubit. The qubit phase accumulators $\Delta\varphi_q$ of each qubit record may also be updated to account for the location effect of the qubits being located in particular sections during the time that the two qubit gate was being performed. For example, the qubit phase accumulator $\Delta\varphi_q$ for qubit 0 may be incremented by the value $f_B^*(t_9-t_8)$.

As should be understood, FIG. 5 illustrates one example of real-time or near real-time phase tracking of qubits of a quantum computer 110, according to an example embodiment, and is provided as illustration of an example. Various other scenarios may be performed according to various other embodiments, as would be obvious to one of ordinary skill in the art based on the disclosure provided herein.

Technical Advantages

Various embodiments provide technical solutions to the technical problem of precisely and accurately matching a signal phase being applied to a quantum object (e.g., atom, ion, and/or the like) of a quantum system with the phase of the quantum object. For example, various embodiments provide for the real-time or near real-time determination of the phase of the quantum object at the time the signal is to interact with the quantum object such that the operation of the manipulation source generating the signal may be modified such that the phase of the signal corresponds to, matches, and/or is approximately equal to the phase of the quantum object at the interaction time. Thereby, the shock experienced by the quantum object as a result of the interaction with the signal (e.g., due to the phase of the signal not matching the phase of the quantum object) may be reduced such that the outcome of manipulating the quantum object (e.g., via the application of the signal) provides a more robust and repeatable result. Additionally, the determination of the interaction time phase of a quantum object (with respect to a manipulation event involving the quantum object) based on the periodically updated calibration table, in various embodiments, enables the interaction time phase to be more accurately determined because any drift in the manipulation sources is accounted for by the information/data stored in the calibration table. Moreover, in various embodiments, the interaction time phase is determined based on both the location and/or transportation effect and the quantum operation effect, allowing for a more accurate determination of the interaction time phase of the quantum object. By more accurately determining the interaction time phase of the quantum object, a manipulation source may be operated to provide a signal having a phase that more accurately corresponds to, matches, and/or is approximately equal to the actual phase of the particular qubit (e.g., the threshold phase difference $\Delta\phi_T$ can be smaller) leading to more robust and repeatable manipulation event results. For example, in the case of the quantum system being part of a trapped ion quantum computer, these improvements in phase tracking and correction result in improved qubit coherence, qubit gate fidelity, and a lower overall quantum computer error rate.

Furthermore, the real-time or near real-time determination of the interaction time phase of the quantum objects allows for an algorithm (quantum algorithms being executed by a quantum computer) to be updated during the execution of the algorithm. Thus, various embodiments provide additional flexibility in the performance of quantum algorithms being executed by a quantum computer by enabling the quantum algorithm to be modified in real-time or near real-time with respect to the execution of the quantum algorithm (e.g., during the execution of the quantum algorithm).

Exemplary User Computing Entity

FIG. 6 provides an illustrative schematic representative of an example user computing entity 10 that can be used in conjunction with embodiments of the present invention. In various embodiments, a user computing entity 10 is configured to allow a user to provide input to the quantum computer system 100 (e.g., via a user interface of the user computing entity 10) and receive, view, and/or the like output from the quantum computer system 100.

As shown in FIG. 6, a user computing entity 10 can include an antenna 612, a transmitter 604 (e.g., radio), a receiver 606 (e.g., radio), and a processing element 608 that provides signals to and receives signals from the transmitter 604 and receiver 606, respectively. The signals provided to and received from the transmitter 604 and the receiver 606, respectively, may include signaling information/data in accordance with an air interface standard of applicable wireless systems to communicate with various entities, such as a system computing entity 20, and/or the like. In this regard, the user computing entity 10 may be capable of operating with one or more air interface standards, communication protocols, modulation types, and access types. More particularly, the user computing entity 10 may operate in accordance with any of a number of wireless communication standards and protocols. In a particular embodiment, the user computing device 10 may operate in accordance with multiple wireless communication standards and protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Via these communication standards and protocols, the user computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 10 can also download changes, add-ons, and updates, for instance, to its firmware, software (e.g., including executable instructions, applications, program modules), and operating system.

According to one embodiment, the user computing entity 10 may include location determining aspects, devices, modules, functionalities, and/or similar words used herein interchangeably. For example, the user computing entity 10 may include outdoor positioning aspects, such as a location module adapted to acquire, for instance, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the user computing entity's 10 position in connection with a variety of other systems, including cellular towers, Wi-Fi access points, and/or the like. Similarly, the user computing entity 10 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 10 may also comprise a user interface device comprising one or more user input/output interfaces (e.g., a display 616 and/or speaker/speaker driver coupled to a processing element 608 and a touch screen, keyboard, mouse, and/or microphone coupled to a processing element 608). For instance, the user output interface may be configured to provide an application, browser, user interface, interface, dashboard, screen, webpage, page, and/or similar words used herein interchangeably executing on and/or accessible via the user computing entity 10 to cause display or audible presentation of information/data and for user interaction therewith via one or more user input interfaces. The user input interface can comprise any of a number of devices allowing the user computing entity 10 to receive data, such as a keypad 618 (hard or soft), a touch display, voice/speech or motion interfaces, scanners, readers, or other input device. In embodiments including a keypad 618, the keypad 618 can include (or cause display of) the conventional numeric (0-9) and related keys (#, *), and other keys used for operating the user computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 10 can collect information/data, user interaction/input, and/or the like.

The user computing entity 10 can also include volatile storage or memory 622 and/or non-volatile storage or memory 624, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 10.

In example embodiments, the user computing entity 10 may be in communication with other user computing entities 10 and/or a system computing entity 20.

Exemplary System Computing Entity

FIG. 7 provides a schematic of a system computing entity 20 according to one embodiment of the present invention. As noted above, the system computing entity 20 may be configured to act as an intermediary between the controller 30 of the quantum computer 110 and one or more user computing entities 10. In general, the terms system computing entity, computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for instance, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 7, in one embodiment, the system computing entity 20 may include or be in communication with one or more processing elements 705 (also referred to as processors, processing circuitry, and/or similar terms used herein interchangeably) that communicate with other elements within the system computing entity 20 via a bus, for instance. As will be understood, the processing element 705 may be embodied in a number of different ways. For example, the processing element 705 may be embodied as one or more complex programmable logic devices (CPLDs), microprocessors, multi-core processors, coprocessing entities, application-specific instruction-set processors (ASIPs), and/or controllers. Further, the processing element 705 may be embodied as one or more other processing devices or circuitry. The term circuitry may refer to an entirely hardware embodiment or a combination of hardware and computer program products. Thus, the processing element 705 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 705 may be configured for a particular use or configured to execute instructions stored in volatile or non-volatile media or otherwise accessible to the processing element 705. As such, whether configured by hardware or computer program products, or by a combination thereof, the processing element 705 may be capable of performing steps or operations according to embodiments of the present invention when configured accordingly.

In one embodiment, the system computing entity 20 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 710 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the system computing entity 20 may further include or be in communication with volatile media (also referred to as volatile storage, memory, memory storage, memory circuitry and/or similar terms used herein interchangeably). In one embodiment, the volatile storage or memory may also include one or more volatile storage or memory media 715 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for instance, the processing element 605. Thus, the databases, database instances, database management system entities, data, applications, programs, program modules, scripts, source code, object code, byte code, compiled code, interpreted code, machine code, executable instructions, and/or the like may be used to control certain aspects of the operation of the system computing entity 20 with the assistance of the processing element 705 and operating system.

As indicated, in one embodiment, the system computing entity 20 may also include one or more network and/or communications interfaces 720 for communicating with various computing entities, such as by communicating data, content, information, and/or similar terms used herein interchangeably that can be transmitted, received, operated on, processed, displayed, stored, and/or the like. For instance, the system computing entity 20 may communicate with computing entities or communication interfaces of one or more user computing entities 10, controller 30, and/or the like.

As indicated, in one embodiment, the system computing entity 20 may also include one or more network and/or communications interfaces 720 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system computing entity 20 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The system computing entity 20 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the system computing entity's 20 components may be located remotely from other system computing entity 20 components, such as in a distributed system. Furthermore, one or more of the components may be combined and additional components performing functions described herein may be included in the system computing entity 20. Thus, the system computing entity 20 can be adapted to accommodate a variety of needs and circumstances.

Exemplary Controller

As shown in FIG. 8, in various embodiments, the controller 30 may comprise various controller elements including processing elements 805, memory 810, driver controller elements 815, a communication interface 820, analog-digital converter elements 825, and/or the like. For example, the processing elements 805 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 805 of the controller 30 comprises a clock and/or is in communication with a clock. For example, the memory 810 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 810 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 810 (e.g., by a processing element 805) causes the controller 30 to perform one or more steps, operations, processes, procedures and/or the like described herein for tracking the phase of a quantum object within a quantum system and causing the adjustment of the phase of one or more manipulation sources and/or signal(s) generated thereby.

In various embodiments, the driver controller elements 815 may include one or more drivers and/or controller elements each configured to control one or more drivers. In various embodiments, the driver controller elements 815 may comprise drivers and/or driver controllers. For example, the driver controllers may be configured to cause one or more corresponding driver to be operated in accordance with executable instructions, commands, and/or the like scheduled and executed by the controller 30 (e.g., by the processing element 805). In various embodiments, the driver controller elements 815 may enable the controller 30 to operate a manipulation source 64 and/or modify the operation of a manipulation source 64 so as to control the phase of a signal generated by the manipulation source 64. In various embodiments, the drivers may be laser drivers; vacuum component drivers; drivers for controlling the flow of current and/or voltage applied to direct current (DC), radio frequency (RF), trapping/transport and/or other electrodes used for maintaining and/or controlling the ion trapping potential of the ion trap 50; cryogenic and/or vacuum system component drivers; and/or the like. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 825 configured to receive signals from one or more optical receiver components, calibration sensors 62, and/or the like. In various embodiments, the controller 30 may comprise a communication interface 820 for interfacing and/or communicating with a system computing entity 20. For example, the controller 30 may comprise a communication interface 820 for receiving executable instructions, command sets, and/or the like from the system computing entity 20 and providing output received from the quantum computer 110 (e.g., from an optical collection system) and/or the result of a processing the output to the system computing entity 20. In various embodiments, the system computing entity 20 and the controller 30 may communicate via a direct wired and/or wireless connection and/or one or more wired and/or wireless networks.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    identifying, by a controller, a time to perform a manipulation event on a particular quantum object trapped by an ion trap based at least in part on one or more executable instructions in an executable queue to be executed by the controller, wherein the particular quantum object is identified based at least in part on a quantum object identifier extracted from at least one of the one or more executable instructions, wherein the controller comprises at least one processor and a memory storing the executable queue, and wherein the at least one processor activates one or more laser drivers to cause occurrence of the manipulation event;
    determining, by the controller, a location and transport effect on a phase of the particular quantum object based on (a) one or more locations where the particular quantum object was located for respective periods of time between a first time and the time to perform the manipulation event and respective frequencies associated with the one or locations, wherein the respective frequencies are determined via calibration, and (b) one or more transport operations performed on the particular quantum object between the first time and the time to perform the manipulation event to move the particular quantum object between respective locations of the one or more locations, wherein an immediately previous phase update for the particular quantum object occurred at the first time;

determining, by the controller, a quantum operation effect on the phase of the particular quantum object based on any quantum operations applied to the particular quantum object between the first time and the time to perform the manipulation event, wherein the quantum operation effect is determined based on computing respective Stark shifts caused by respective operations of the operations applied to the particular quantum object between the first time and the time to perform the manipulation event;

based on the location and transport effect, the quantum operation effect, and the time to perform the manipulation event, determining, by the controller, an interaction phase of the particular quantum object, wherein the interaction phase of the particular quantum object is a phase of the particular quantum object at the time to perform the manipulation event; and causing, by the controller, phases of one or more signals (a) generated by one or more lasers controlled by respective laser drivers of the one or more laser drivers and (b) corresponding to the manipulation event to be adjusted such that the phases of the one or more signals correspond to the interaction phase of the particular quantum object at the time to perform the manipulation event.

2. The method of claim 1, wherein the one or more signals are incident on the particular quantum object at the time to perform the manipulation event.

3. The method of claim 1, wherein the controller is configured to control operation of one or more voltage sources.

4. The method of claim 1, wherein the controller, the one or more lasers, and the one or more laser drivers are part of a trapped ion quantum computer and the particular quantum object is a qubit of the trapped ion quantum computer.

5. The method of claim 1, wherein a phase of a signal of the one or more signals corresponds to the interaction phase of the particular quantum object when an absolute value of a difference between the phase of the signal and the interaction phase of the particular quantum object satisfies a phase difference threshold requirement.

6. The method of claim 5, wherein the absolute value of the difference between the phase of the signal and the interaction phase satisfies the phase difference threshold requirement when the absolute value of the difference between the phase of the signal and the interaction phase is less than a set phase difference threshold.

7. The method of claim 1, wherein the identifying of the time to perform the manipulation event, the determining of the location and transport effect of the phase of the particular quantum object, the determining of the quantum operation effect on the phase of the particular quantum object, and the causing of the adjusting of the phases of the one or more signals are performed in real-time or near real-time with respect to one another.

8. The method of claim 1, wherein the location and transport effect corresponds to a phase change due to changes to an effective frequency of the particular quantum object based on one or more locations of the particular quantum object and transport of the particular quantum object through the one or more locations between the first time and the time to perform the manipulation event.

9. A controller associated with a quantum system, the controller comprising at least one processing element and at least one memory including computer program code, the at least one memory and the computer program code configured to, with the processing element, cause the controller to at least:

identify a time to perform a manipulation event on a particular quantum object trapped in an ion trap based at least in part on one or more executable instructions in an executable queue to be executed by the controller, wherein the particular quantum object is identified based at least in part on a quantum object identifier extracted from at least one of the one or more executable instructions, wherein the executable queue is stored in the at least one memory, and wherein the at least one processing element activates one or more laser drivers to cause occurrence of the manipulation event;

determine a location and transport effect on a phase of the particular quantum object based on (a) one or more locations where the particular quantum object was located for respective periods of time between a first time and the time to perform the manipulation event and respective frequencies associated with the one or locations, wherein the respective frequencies are determined via calibration, and (b) one or more transport operations performed on the particular quantum object between the first time and the time to perform the manipulation event to move the particular quantum object between respective locations of the one or more locations, wherein an immediately previous phase update for the particular quantum object occurred at the first time;

determine a quantum operation effect on the phase of the particular quantum object based on any quantum operations applied to the particular quantum object between the first time and the time to perform the manipulation event, wherein the quantum operation effect is determined based on computing respective Stark shifts caused by respective operations of the operations applied to the particular quantum object between the first time and the time to perform the manipulation event;

based on the location and transport effect, the quantum operation effect, and the time to perform the manipulation event, determine an interaction phase of the particular quantum object, wherein the interaction phase of the particular quantum object is a phase of the particular quantum object at the time to perform the manipulation event; and cause phases of one or more signals (a) generated by one or more lasers controlled by respective laser drivers of the one or more laser drivers and (b) corresponding to the manipulation event to be adjusted such that the phases of the one or more signals correspond to the interaction phase of the particular quantum object at the time to perform the manipulation event.

10. The controller of claim 9, wherein the one or more signals are incident on the particular quantum object at the time to perform the manipulation event.

11. The controller of claim 9, wherein the controller is configured to control operation of one or more voltage sources.

12. The controller of claim 9, wherein the controller, the one or more lasers, and the one or more laser drivers are part of a trapped ion quantum computer and the particular quantum object is a qubit of the trapped ion quantum computer.

13. The controller of claim 9, wherein a phase of a signal of the one or more signals corresponds to the interaction phase of the particular quantum object when an absolute value of a difference between the phase of the signal and the interaction phase of the particular quantum object satisfies a phase difference threshold requirement.

14. The controller of claim 13, wherein the absolute value of the difference between the phase of the signal and the interaction phase satisfies the phase difference threshold requirement when the absolute value of the difference between the phase of the signal and the interaction phase is less than a set phase difference threshold.

15. The controller of claim 9, wherein the identifying the time to perform the manipulation event, the determining of the location and transport effect of the phase of the particular quantum object, the determining of the quantum operation effect on the phase of the particular quantum object, and the causing of the adjusting of the phases of the one or more signals are performed in real-time or near real-time with respect to one another.

16. The controller of claim 9, wherein the location and transport effect corresponds to a phase change due to changes to an effective frequency of the particular quantum object based on one or more locations of the particular quantum object and transport of the particular quantum object through the one or more locations between the first time and the time to perform the manipulation event.

17. A quantum system comprising:
   an ion trap configured to confine one or more quantum objects, the one or more quantum objects comprising a particular quantum object;
   one or more lasers configured to generate one or more signals;
   one or more laser drivers configured to control operation of respective lasers of the one or more lasers; and
   a controller, the controller comprising at least one processing element and at least one memory including computer program code, the at least one memory and the computer program code configured to, with the processing element, cause the controller to at least:
      determine a location and transport effect on a phase of the particular quantum object based (a) one or more locations where the particular quantum object was located for respective periods of time between a first time and a time to perform a manipulation event and respective frequencies associated with the one or locations, wherein the respective frequencies are determined via calibration, and (b) one or more transport operations performed on the particular quantum object between the first time and the time to perform the manipulation event to move the particular quantum object between respective locations of the one or more locations, wherein an immediately previous phase update for the particular quantum object occurred at the first time;
      determine a quantum operation effect on the phase of the particular quantum object based on any quantum operations applied to the particular quantum object between the first time and the time to perform the manipulation event, wherein the quantum operation effect is determined based on computing respective Stark shifts caused by respective operations of the operations applied to the particular quantum object between the first time and the time to perform the manipulation event;
      based on the location and transport effect, the quantum operation effect, and the time to perform the manipulation event, determine an interaction phase of the particular quantum object; and
      cause phases of the one or more signals generated by the one or more lasers controlled by respective laser drivers of the one or more laser drivers to be adjusted such that the phases of the one or more signals correspond to the interaction phase of the particular quantum object at the time to perform the manipulation event.

18. The quantum system of claim 17, wherein the one or more signals are incident on the particular quantum object at the time to perform the manipulation event.

19. The quantum system of claim 17, wherein a phase of a signal of the one or more signals corresponds to the interaction phase of the particular quantum object when an absolute value of a difference between the phase of the signal and the interaction phase of the particular quantum object satisfies a phase difference threshold requirement.

20. The quantum system of claim 19, wherein the absolute value of the difference between the phase of the signal and the interaction phase satisfies the phase difference threshold requirement when the absolute value of the difference between the phase of the signal and the interaction phase is less than a set phase difference threshold.

21. The quantum system of claim 17, further comprising one of more signal paths configured to provide the one or more signals to the particular quantum object in the ion trap.

* * * * *

UNITED STATES PATENT AND TRADEMARK OFFICE
CERTIFICATE OF CORRECTION

| | | |
|---|---|---|
| PATENT NO. | : 11,900,144 B2 | Page 1 of 1 |
| APPLICATION NO. | : 16/716973 | |
| DATED | : February 13, 2024 | |
| INVENTOR(S) | : James A. Walker et al. | |

It is certified that error appears in the above-identified patent and that said Letters Patent is hereby corrected as shown below:

In the Claims

In Column 32, Line 48, Claim 21, delete "one of more" and insert -- one or more --, therefor.

Signed and Sealed this
Eighth Day of October, 2024

*Katherine Kelly Vidal*

Katherine Kelly Vidal
*Director of the United States Patent and Trademark Office*